United States Patent [19]

Hashimoto

[11] Patent Number: 4,995,707
[45] Date of Patent: Feb. 26, 1991

[54] VARI-FOCAL LENS SYSTEM
[75] Inventor: Takeshi Hashimoto, Tokyo, Japan
[73] Assignee: Olympus Optical Co., Ltd., Tokyo, Japan
[21] Appl. No.: 299,159
[22] Filed: Jan. 19, 1989
[30] Foreign Application Priority Data
  Jan. 20, 1988 [JP] Japan .................................. 63-8379
[51] Int. Cl.$^5$ ...................... G02B 15/14; G02B 13/18
[52] U.S. Cl. .................................... 350/427; 350/432
[58] Field of Search ................. 350/423, 427, 432–435
[56] References Cited
U.S. PATENT DOCUMENTS
  4,416,518 12/1983 Hugues et al. .................. 350/432 X
  4,721,371 1/1988 Imai ............................... 350/432 X
FOREIGN PATENT DOCUMENTS
  45-39430 12/1970 Japan .
  58-102208 6/1983 Japan .
  58-153913 9/1983 Japan .
  60-91320 5/1985 Japan .
  61-110112 5/1986 Japan .
  62-198813 9/1987 Japan .

Primary Examiner—Scott J. Sugarman
Attorney, Agent, or Firm—Cushman, Darby & Cushman

[57] ABSTRACT

A compact, light-weight vari-focal lens system having a high vari-focal ratio, a high aperture ratio and comprising a small number of lens components. Said vari-focal lens system comprises a first lens unit having positive refractive power, a second lens unit having negative refractive power, a third lens unit having positive refractive power and a fourth lens unit having positive refractive power, said second and third lens units being shifted along the optical axis for varying focal length while varying the airspace reserved therebetween, said second lens unit consisting of a single concave lens component having an aspherical surface and said third lens unit consisting of a single positive lens component.

28 Claims, 18 Drawing Sheets

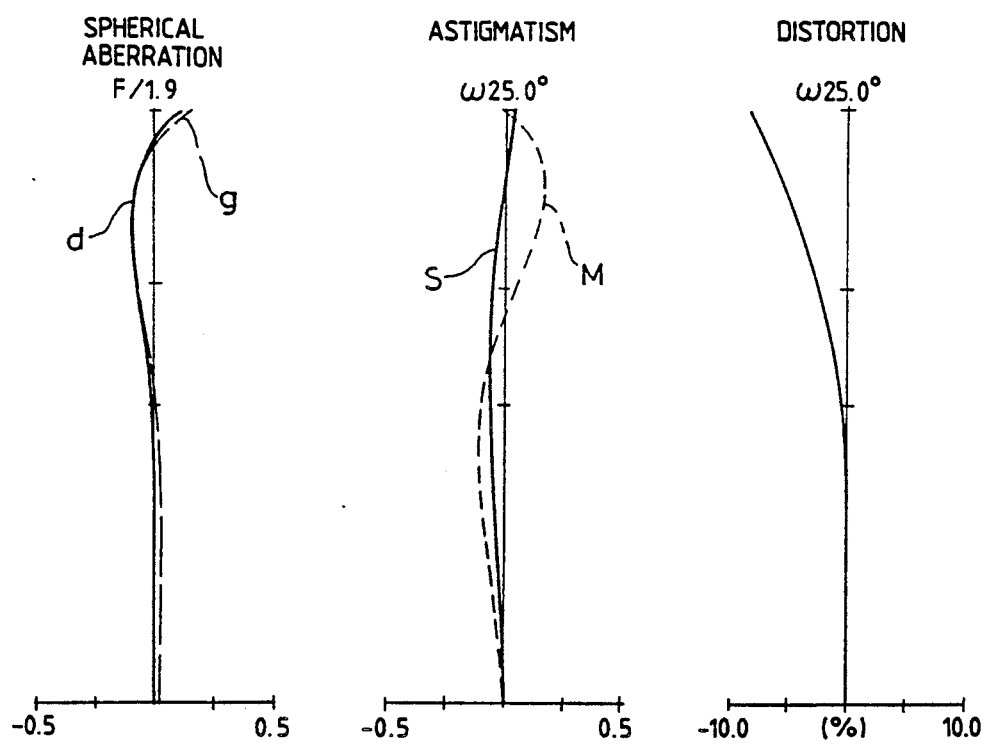
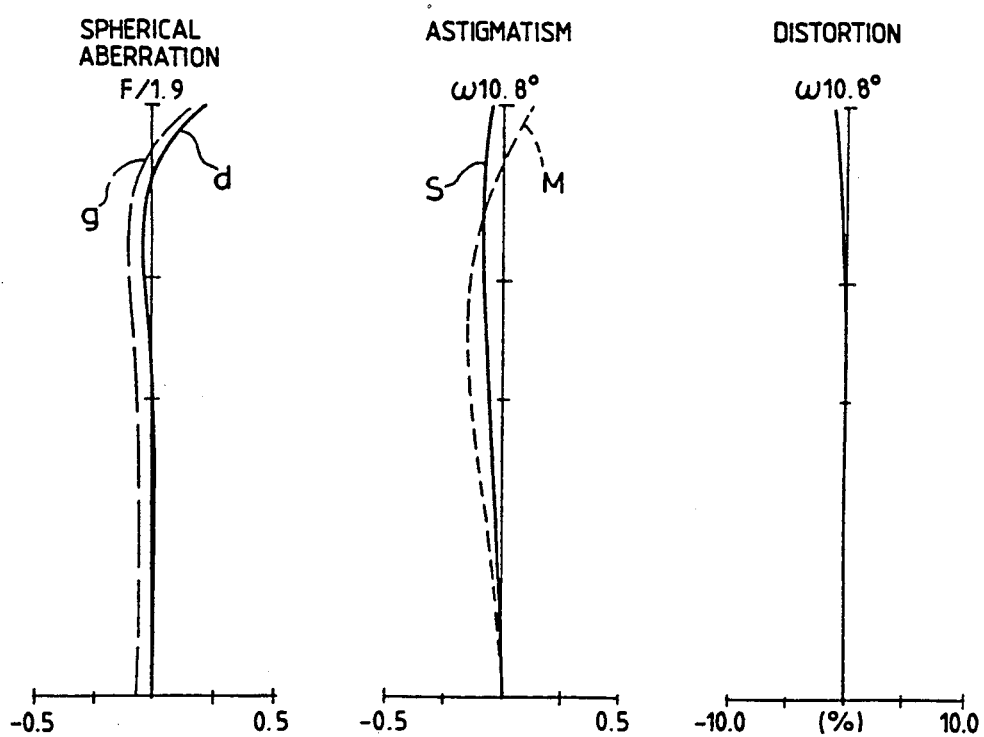

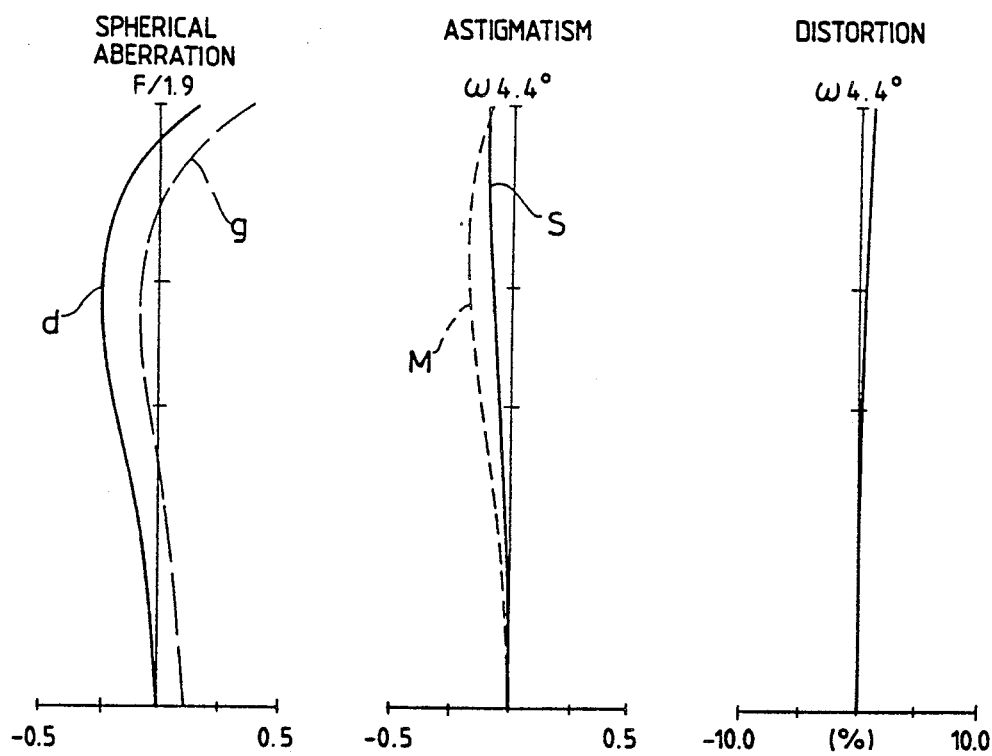
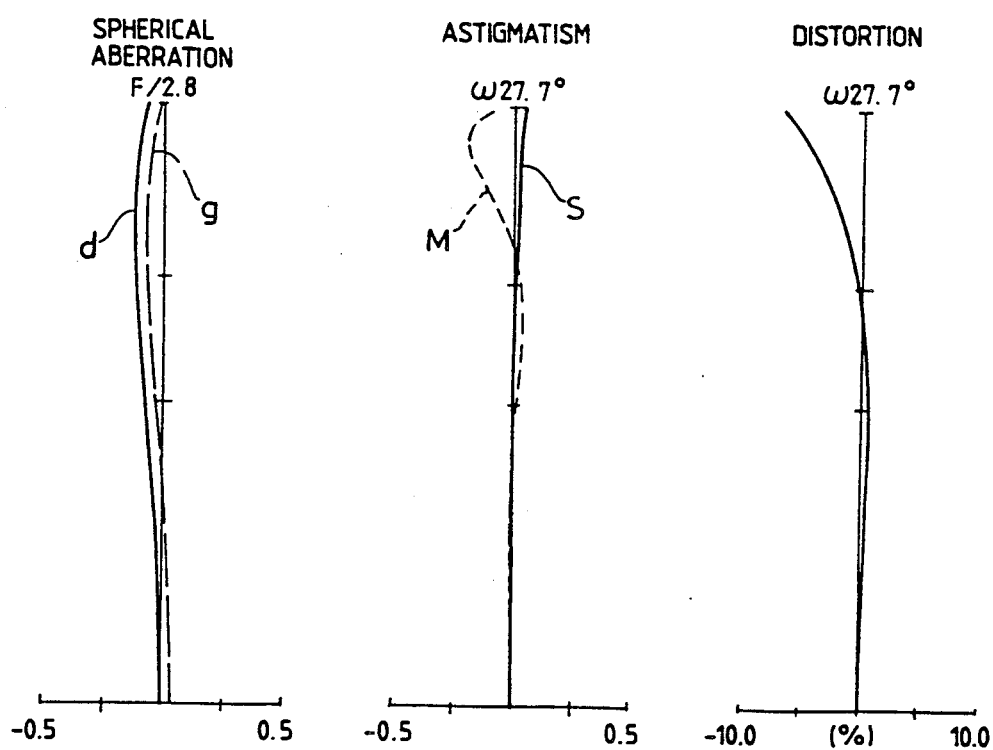

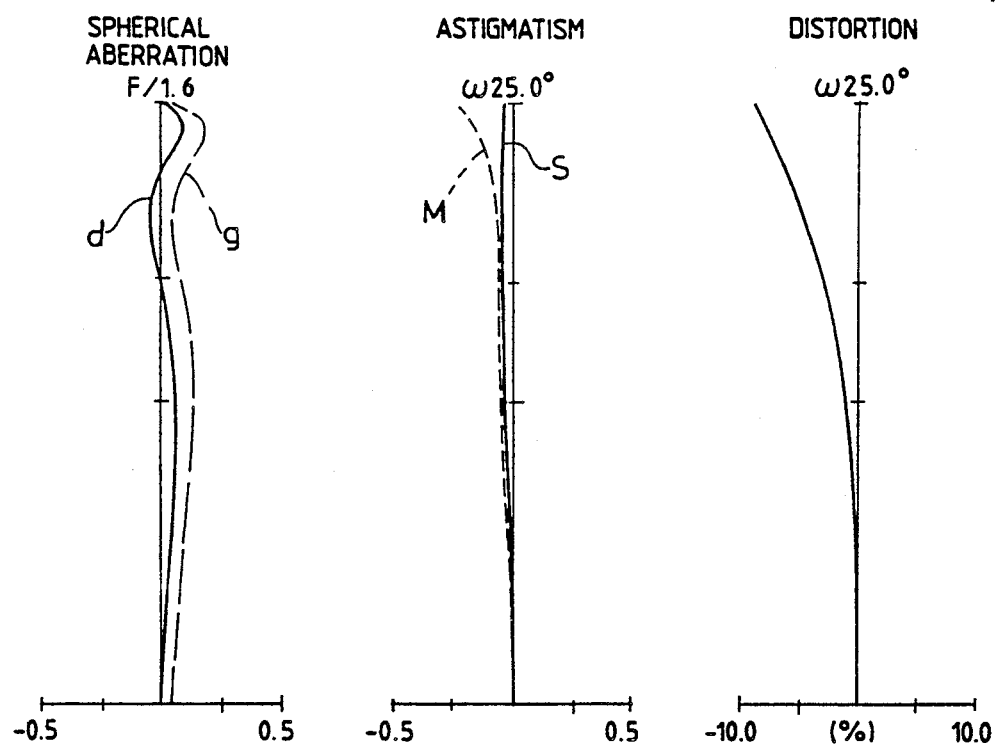
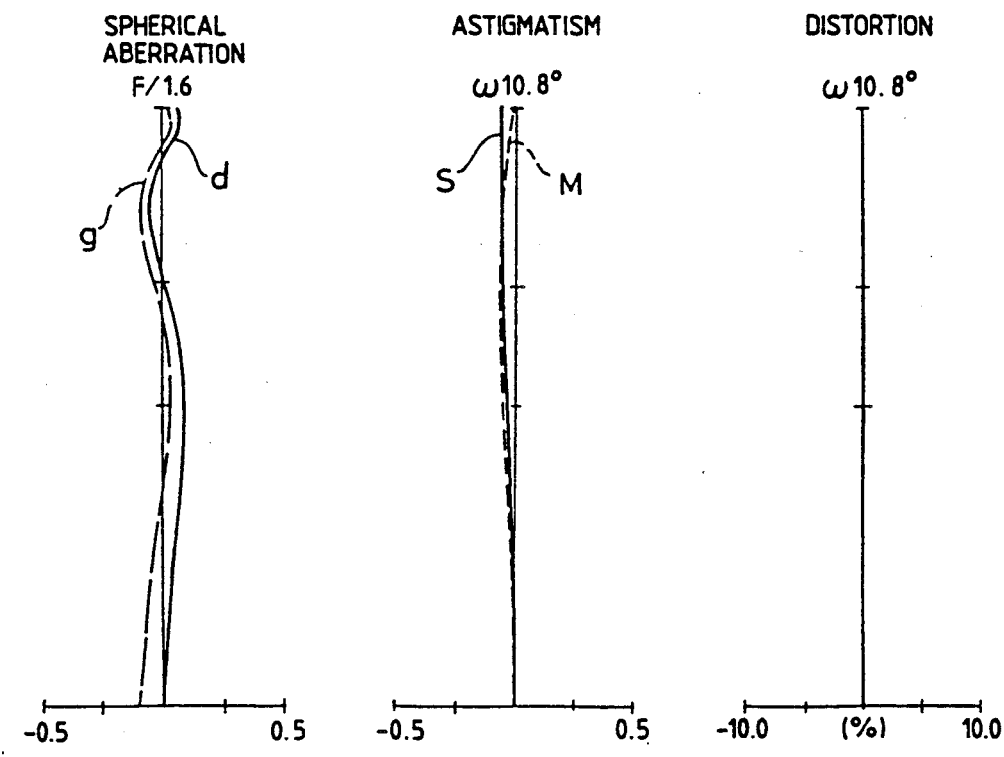

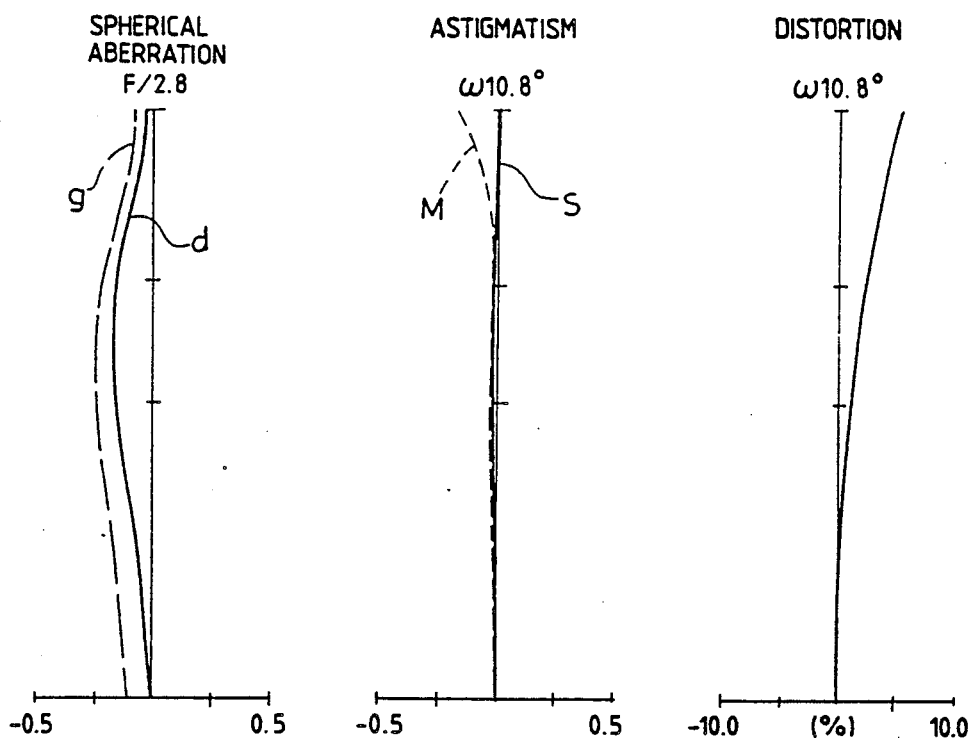
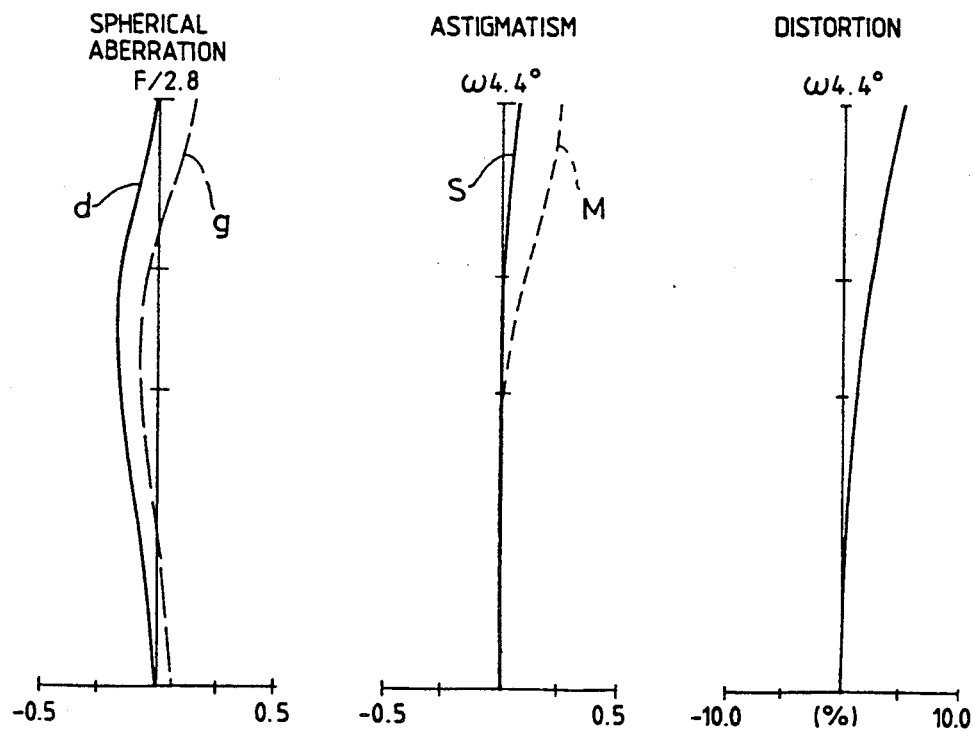

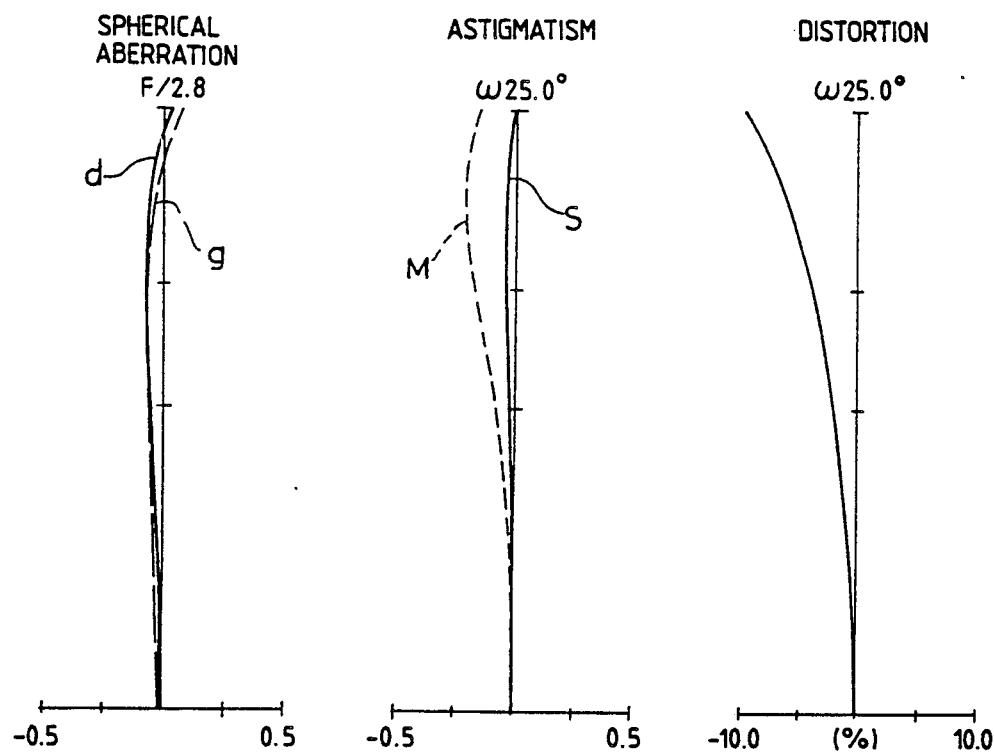
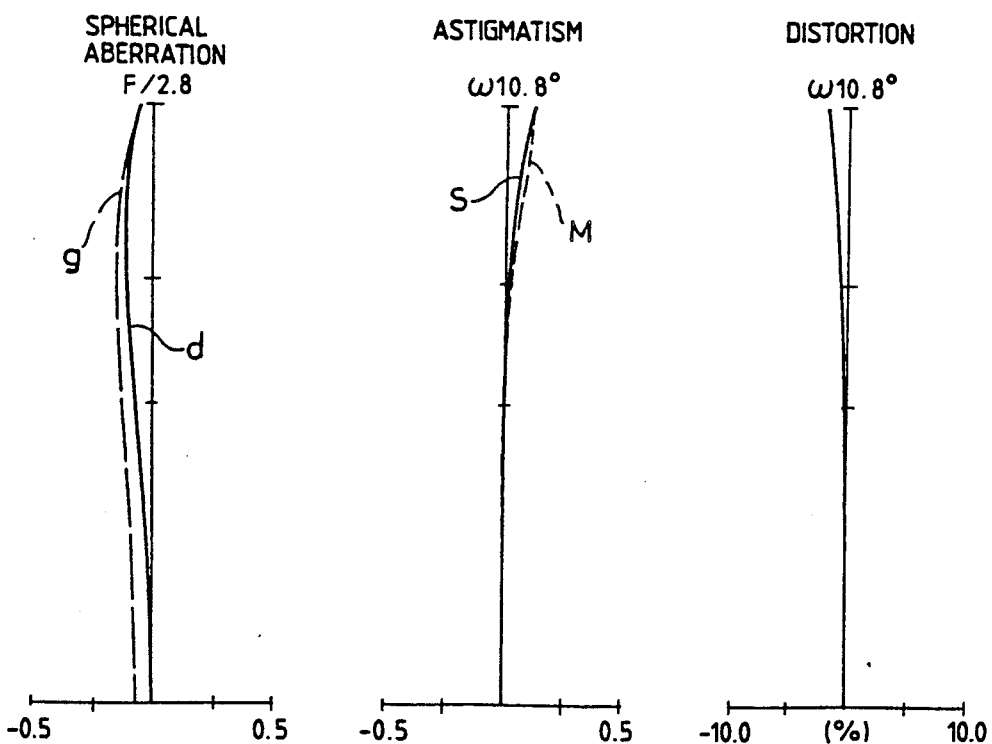

VARI-FOCAL LENS SYSTEM

BACKGROUND OF THE INVENTION

1. Field of the invention:

The present invention relates to a vari-focal lens system for cameras and more specifically to a vari-focal lens system for video cameras.

2. Description of the prior art:

In the recent years, compact and light-weight video cameras are offered at low prices, and demand for domestic video cameras is rapidly increasing. In order to further develop the demand for domestic video cameras, it is necessary to design compacter video cameras which are ligher in weight and manufacturable at lower cost. Under these circumstances, it is important to design compact, light-weight lens systems manufacturable at low cost.

At present, zoom lens systems to be used in video cameras for domestic use are mainly designed for a zoom ratio of 6 and an F-number on the order of F/1.2 to F/1.6. This is because the above-mentioned specifications are suited for obtaining high efficiency for design and meeting the practical needs.

As examples of the conventional zoom lens systems for video cameras, there are already known the lens systems disclosed by Japanese Unexamined Published Patent Application No. 102208/58, Japanese Unexamined Published Patent Application No. 153913/58 and so on. However, these zoom lens systems comprise a vari-focal unit consisting of three lens components and a relay lens system consisting of seven to eight lens components, or is composed of fourteen to fifteen lens components in total, whereby these lens systems have a common defect that they comprise a large number of lens components, require high manufacturing cost, have large diameters and are heavy in weight. Further, the zoom lens system disclosed by Japanese Unexamined Published Patent Application No. 110112/61 is so designed as to compose a vari-focal unit of two lens components and a relay lens system of three lens components so that the zoom lens system can be composed of eight lens components in total and manufactured at low cost.

However, this zoom lens system adopts extremely high curvature on the surfaces of the cemented lens components arranged in the vari-focal unit and the relay lens system, and requires high manufacturing cost contrary to the purpose thereof. Furthermore, the zoom lens system disclosed by Japanese Unexamined Published Patent Application No. 198813/62 is so designed as to consist of six lens components in total by composing a vari-focal unit of a single lens component and a relay lens system of three lens components. However, this zoom lens system has a low vari-focal ratio, and is usable only at the wide position and tele position thereof.

SUMMARY OF THE INVENTION

A primary object of the present invention is to provide a compact, light-weight vari-focal lens system for video cameras which is manufacturable at low cost, designed for a vari-focal ratio of 4 to 6 and an F-number on the order of F/1.6 to F/2.8, and composed of six to eight lens components.

The vari-focal lens system according to the present invention comprises, in the order from the object side, a first lens unit having positive refractive power, a second lens unit having negative refractive power and movable for varying focal length, a third lens unit having positive refractive power and movable for varying focal length, and a fourth lens unit to be kept fixed during variation of focal length. In order to vary focal length and correct the image position displaced by varying focal length of the lens system, the second lens unit and the third lens unit are moved along the optical axis while varying the airspace reserved between these lens units. The vari-focal lens system according to the present invention is characterized in that the second lens unit is composed of a single biconcave lens component having an aspherical surface and the third lens unit is composed of a single lens component having positive refractive power.

Most of the conventional zoom lens systems are generally designed in such a manner that the second lens unit consists of a negative lens component, a negative lens component and a positive lens component arranged in the order from the object side, whereas the third lens unit consists of one or two lens component(s), that focal length thereof is varied by moving the second lens unit and that image position is corrected by moving the third lens unit in conjunction with the movement of the second lens unit.

The present invention has omitted the third lens unit having the above-described composition for reducing the number of the lens components, and divided the second lens unit consisting of the two negative lens components and the positive lens component into a unit consisting of the two negative lens components and another unit consisting of the positive lens component. Further, the present invention has designed one of the above-mentioned two negative lens component as an aspherical lens component and omitted the other negative lens component. This design has developed a new type of zoom lens system which uses the negative aspherical lens component and the rest positive lens component as the second lens unit and the third lens unit respectively, and is so adapted as to perform correction of deviation of the image position simultaneously with variation of focal length by moving the second lens unit and the third lens unit while varying the air-space reserved therebetween.

In the lens system according to the present invention, the second lens unit which consists of the reduced number of lens component, i.e., a single negative lens component must have a strong refractive power for reserving a high vari-focal ratio and is designed as a biconcave lens component. The offaxial ray to attain to the high image portion especially at the wide position passes through the marginal portion of the second lens unit. If the above-mentioned biconcave lens component is so formed as to have spherical surfaces only, remarkable distortion will be produced by the marginal portion of the lens component when curvature of the surfaces is increased to reserve a high vari-focal ratio. For this reason, the zoom lens system according to the present invention adopts, as the second lens unit, an aspherical lens component having an aspherical surface which has a surface nearly spherical at the lens center and curved at the marginal portion so as to decrease the curvature of the nearly spherical surface of the lens center. This aspherical surface makes it possible to correct distortion favorably even when refractive power of the negative lens component is strengthened obtaining a high vari-focal ratio.

Deviation of the above-described aspherical surface from the spherical surface should desirably be within the range defined by the following condition (1):

$$3 \times 10^{-3} < \left| \frac{\Delta x \cdot r}{h \cdot f_W} \right| < 5 \times 10^{-1} \tag{1}$$

wherein the reference symbol r represents radius of curvature on the spherical surface tangential to said aspherical surface on the optical axis (standard spherical surface), the reference symbol h designates distance from the optical axis to the intersection between the principal ray to attain to the maximum image height and said aspherical surface, the reference symbol $\Delta x$ denotes deviation of said intersection from the standard spherical surface in the direction along the optical axis, and the reference symbol $f_W$ represents focal length of the vari-focal lens system as a whole at the maximum field angle (wide position).

If the lower limit $(3 \times 10^{-3})$ of the condition (1) is exceeded, the deviation $\Delta x$ of the aspherical surface will be made insufficient for correction of the aberration by increasing refractive power of the negative lens component of the second lens unit for reserving a high vari-focal ratio and distortion will hardly be correctable. If the upper limit $(5 \times 10^{-1})$ of the condition (1) is exceeded, in contrast, the deviation $\Delta x$ will be made excessive when refractive power of the negative lens component of the second lens unit is increased for obtaining a high vari-focal ratio, thereby bringing about an advantage for correction of distortion but aggravating astigmatism and other aberration too remarkably to be correctable.

The zoom lens system according to the present invention is designed in such a manner that the second lens unit and the third lens unit thereof are composed of a single negative lens component and a single positive lens component respectively which are obtained by dividing the second lens unit of the conventional zoom lens system. Accordingly, it is possible to apply also to the zoom lens system according to the present invention the method applied to the second lens unit of the conventional zoom lens system, i.e., the method to select a lowly dispersive material for the negative lens component used as a means for correcting chromatic aberration and a highly dispersive material for the positive lens component. That is to say, a lowly dispersive material is to be selected for the negative lens component (biconcave lens component) of the second lens unit, whereas a highly dispersive material is to be used for the positive lens component of the third lens unit of the zoom lens system according to the present invention. Such selection makes it possible to correct, by using the third lens unit, the lateral chromatic aberration remarkably aggravated by the second lens unit.

In the zoom lens system according to the present invention, however, the airspace reserved between the second lens unit and the third lens unit is varied for correcting the deviation of the image position caused by varying focal length. Since the lateral chromatic aberration is varied by varying the airspace reserved between these lens units, it is necessary to prevent the variation of the lateral chromatic aberration. It is insufficient for this purpose only to set the difference in Abbe's number between the second lens unit and the third lens unit within a desirable range.

In order to minimize variation of the aberration which is caused by varying the airspace reserved between the second lens unit and the third lens unit, it is required to minimize (desirably zero) the difference, in the airspace reserved between the second lens unit and the third lens unit, between the maximum field angle (wide position) and the minimum field angle (tele position).

In order to meet this requirement, the zoom lens system should desirably satisfy the following conditions (2) and (3):

$$\nu_2 - \nu_3 > 15 \tag{2}$$

$$|D_W - D_T|/\Delta D < 0.6 \tag{3} \text{ ps}$$

wherein the reference symbols $\nu_2$ and $\nu_3$ represent Abbe's numbers of the biconcave lens component of the second lens unit and the positive lens component of the third lens unit respectively, the reference symbols $D_W$ and $D_T$ designate airspaces between the second lens unit and the third lens unit at the wide position and the tele position respectively, and the reference symbol $\Delta D$ denotes shift distance of the second lens unit when focal length is varied from the wide position to the tele position.

If the condition (2) is not satisfied, i.e., if difference in Abbe's number is smaller than 15, it will be impossible to reserve a sufficient difference in dispersion between the second lens unit and the third lens unit, and the lateral chromatic aberration will hardly be correctable.

If the condition (3) is not satisfied, i.e., if the upper limit of 0.6 is exceeded, the lateral chromatic aberration will hardly be correctable even when a sufficient difference in dispersion between the second lens unit and the third lens unit is produced by varying focal length.

As is understood from the foregoing description, the vari-focal lens system according to the present invention has the greatest characteristics not only in the compositions of the second lens unit and the third lens unit but also the movement of these lens units for varying focal length. These characteristics have made it possible to compose the second and third lens units only of two lens components in contrast to the second and third lens units of the conventional vari-focal lens system which are composed of five to three lens components.

Furthermore, when an attempt is made to reduce the number of the lens components of the fourth lens unit, the burdens on the individual lens components for correcting aberrations become heavier and aberrations are aggravated. Especially, spherical aberration and coma are aggravated remarkably.

For correcting spherical aberration, it is desirable to use an aspherical surface on one of the lens components arranged in the vicinity of a stop. In order to correct coma at the same time, however, the present invention selects an aspherical surface as the image side surface of the lens component arranged on the extreme image side in the fourth lens unit, and succeeded in reducing the number of the lens components arranged in the fourth lens unit and preventing aberrations from being aggravated. The aspherical surface used for this purpose should desirably satisfy the following condition (4):

$$1 \times 10^{-3} < \left| \frac{\Delta x \cdot f_{IVB}}{k \cdot f_W} \right| < 2 \times 10^{-1} \tag{2}$$

wherein the reference symbol k represents distance from the optical axis to the intersection between the paraxial marginal ray and the image side surface of the lens component arranged on the extreme image side in the fourth lens unit, the reference symbol Δx designates deviation from the standard spherical surface of the aspherical surface to said intersection in the direction along the optical axis, and the reference symbol $f_{IVB}$ denotes focal length of the lens component arranged on the extreme image side in the fourth lens unit.

If the lower limit $(1 \times 10^{-3})$ of the condition (4) is exceeded, it will be impossible to enlarge deviation of the aspherical surface from the standard spherical surface when refractive power of the lens component arranged on the extreme image side is reserved for balancing power of the fourth lens unit relative to that of the lens system, thereby making it impossible to correct coma, spherical aberration and so on. If the upper limit $(2 \times 10^{-1})$ of the condition (4) is exceeded, deviation of the aspherical surface from the standard spherical surface will be enlarged advantageously for correction of spherical aberration and coma when refractive power of the lens component arranged on the extreme image side in the fourth lens unit is reserved for balancing refractive powers of the lens components arranged in the fourth lens unit, but the other aberrations will be aggravated and hardly correctable. When the second lens unit is composed of the reduced number of lens component, concretely a single lens component, as in the case of the vari-focal lens system according to the present invention, the second lens unit is shifted for a long distance for varying focal length, the entrance pupil is shifted toward the image side and diameter of the lens component disposed at the foremost position of the vari-focal lens system become large, thereby increasing weight of the vari-focal lens system.

When the principal point of the positive lens component arranged before the stop is shifted toward the image side or when the principal point of the negative lens component is shifted toward the object side, the entrance pupil of the lens system is generally shifted toward the object side, thereby making it possible to minimize diameter of the front lens component. In case of a lens system consisting of a small number of lens components like the vari-focal lens system according to the present invention, adjustment of the principal point becomes difficult when main design target is placed on correction of aberrations.

The present invention has succeeded in designing a vari-focal lens system comprising a front lens component having a small diameter and favorably corrected aberrations, despite a small number of lens components constituting the lens system, by performing adjustment of the principal point and correction of aberrations with good balance. Speaking concretely, the vari-focal lens system according to the present invention is designed so as to shift the principal point of the first lens unit toward the image side and bring the principal point of the second lens unit toward the object side by satisfying the following conditions (5) and (6):

$$-1.5 < HB_I/f_S < -4 \times 10^{-2} \qquad (5)$$

$$-7 \times 10^{-2} < HB_{II}/f_S < -1.5 \times 10^{-3} \qquad (6)$$

wherein the reference symbol $HB_I$ represents distance from the image side surface of the lens component arranged on the extreme image side in the first lens unit to the rear principal point of the first lens unit, the reference symbol $HB_{II}$ designates distance from the image side surface of the negative lens component arranged in the second lens unit to the rear principal point of the second lens unit (the direction toward the image side is taken as positive for determining both the distances), and the reference symbol $f_S$ denotes focal length of the vari-focal lens system as a whole at an intermediate focal length thereof, or defined by $\sqrt{f_W f_T}$ (the reference symbols $f_W$ and $f_T$ represent focal lengths of the vari-focal lens system at the wide position and the tele position respectively).

If the lower limit $(-1.5)$ of the condition (5) and the upper limit $(-1.5 \times 10^{-3})$ of the condition (6) are exceeded, it will be impossible to shift the entrance pupil sufficiently frontward, thereby enlarging diameter of the front lens component. If the upper limit $(-4 \times 10^{-2})$ of the condition (5) and the lower limit $(-7 \times 10^{-2})$ of the condition (6) are exceeded, an advantage will be obtained for shifting the entrance pupil frontward but aberrations will not be correctable with good balance and aggravated.

Moreover, the vari-focal lens system according to the present invention is so designed as to permit prolonging back focal length thereof for allowing the members dividing the optical path for a viewfinder, optical filters, etc. to be interposed between the final surface of the lens system and the image pickup surface. Speaking concretely, the vari-focal lens system according to the present invention is designed in such a manner that the front subsystem consisting of the first lens unit, the second lens unit and the third lens unit, and the rear subsystem consisting of the fourth lens unit have refractive powers satisfying the following condition (7):

$$0.3 < |f_{I\,II\,III}/f_{IV}| < 7 \qquad (7)$$

wherein the reference symbol $f_{I\,II\,III}$ represents focal length of the front subsystem at the wide position and the reference symbol $f_{IV}$ designates focal length of the rear subsystem.

If the upper limit (7) of the condition (7) is exceeded, refractive power of the rear subsystem will be too strong relative to refractive power of the front subsystem for obtaining a sufficiently long back focal length and spherical aberration, etc. are aggravated too much for correction. If the lower limit (0.3) of the condition (7) is exceeded, in contrast, refractive power of the front subsystem will be too strong relative to refractive power of the rear subsystem, thereby bringing about an advantage for prolonging back focal length but aggravating distortion, etc. too remarkably for favorable correction.

In addition, the vari-focal lens system according to the present invention is so designed as to perform focusing by shifting the first lens unit frontward. However, the vari-focal lens system according to the present invention can be focused as well also by shifting frontward the fourth lens unit as a whole or some of the lens components of the fourth lens system.

BRIEF DESCRIPTION OF THE DRAWINGS

FIG. 11 through FIG. 13 show curves illustrating aberration characteristics of the Embodiment 1 of the present invention;

FIG. 14 through FIG. 16 show curves illustrating aberration characteristics of the Embodiment 2 of the present invention;

FIG. 17 through FIG. 19 show curves illustrating aberration characteristics of the Embodiment 3 of the present invention;

FIG. 20 through FIG. 22 show curves illustrating aberration characteristics of the Embodiment 4 of the present invention;

FIG. 23 through FIG. 25 show curves illustrating aberration characteristics of the Embodiment 5 of the present invention;

DETAILED DESCRIPTION OF THE PREFERRED EMBODIMENTS

Figure 1:
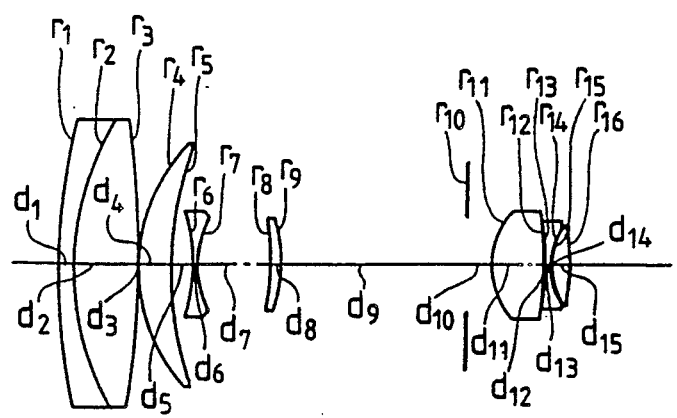
FIG. 1 through FIG. 10 show sectional views illustrating lens arrangements at the wide position in Embodiments 1 through 10 respectively of Embodiments 1 through Embodiment 10 of the vari-focal lens system according to the present invention.

Now, the preferred embodiments of the vari-focal lens system according to the present invention will be described below in the form of numerical data:

Embodiment 1

$f = 9-54$, F/1.9, Maximum image hight $= 4.2$,
$2\omega = 50°-8.9°$

| | | | |
|---|---|---|---|
| $r_1 = 94.6412$ | | | |
| | $d_1 = 2.0000$ | $n_1 = 1.80518$ | $\nu_1 = 25.43$ |
| $r_2 = 38.4450$ | | | |
| | $d_2 = 9.0001$ | $n_2 = 1.56965$ | $\nu_2 = 49.33$ |
| $r_3 = -116.1673$ | | | |
| | $d_3 = 0.1459$ | | |
| $r_4 = 26.3029$ | | | |
| | $d_4 = 4.0005$ | $n_3 = 1.69350$ | $\nu_3 = 53.23$ |
| $r_5 = 47.5098$ | | | |
| | $d_5 = D_1$ (variable) | | |
| $r_6 = -24.6181$ | | | |
| | $d_6 = 0.6877$ | $n_4 = 1.88300$ | $\nu_4 = 40.78$ |
| $r_7 = 12.6521$ (aspherical surface) | | | |
| | $d_7 = D_2$ (variable) | | |
| $r_8 = -35.2648$ | | | |
| | $d_8 = 1.5019$ | $n_5 = 1.84666$ | $\nu_5 = 23.78$ |
| $r_9 = -20.6254$ | | | |
| | $d_9 = D_3$ (variable) | | |
| $r_{10} = \infty$ (stop) | | | |
| | $d_{10} = 3.3014$ | | |
| $r_{11} = 10.6915$ | | | |
| | $d_{11} = 6.9998$ | $n_6 = 1.74950$ | $\nu_6 = 35.27$ |
| $r_{12} = -54.3358$ | | | |
| | $d_{12} = 0.2953$ | | |
| $r_{13} = -40.2653$ | | | |
| | $d_{13} = 0.5002$ | $n_7 = 1.84666$ | $\nu_7 = 23.78$ |
| $r_{14} = 9.1909$ | | | |
| | $d_{14} = 0.3188$ | | |
| $r_{15} = 9.8937$ | | | |
| | $d_{15} = 2.2000$ | $n_8 = 1.60311$ | $\nu_8 = 60.70$ |
| $r_{16} = -33.6823$ (aspherical surface) | | | |

| f | 9 | 22 | 54 |
|---|---|---|---|
| $D_1$ | 3.001 | 19.691 | 29.019 |
| $D_2$ | 10.045 | 12.390 | 5.002 |
| $D_3$ | 25.288 | 6.254 | 4.313 |

(aspherical coefficient)
7th surface   $E = -0.19549 \times 10^{-3}$, $F = 0.26729 \times 10^{-5}$
              $G = -0.44438 \times 10^{-7}$
16th surface  $E = 0.29143 \times 10^{-3}$, $F = -0.16685 \times 10^{-5}$
              $G = 0.76109 \times 10^{-7}$ $$\left|\frac{\Delta x \cdot r}{h \cdot f_W}\right| = 0.034, \quad \nu_2 - \nu_3 = 17$$

$$|D_W - D_T|/\Delta D = 0.194, \quad \left|\frac{\Delta x \cdot f_{IVB}}{k \cdot f_W}\right| = 0.046$$

$HB_I/f_S = -0.23$, $HB_{II}/f_S = -5.6 \times 10^{-3}$
$|f_{I\,II\,III}/f_{IV}| = 1.4$

| Embodiment 2 |
|---|

$f = 8-48$, F/2.8, Maximum image hight = 4.2,
$2\omega = 55.4°-10.0°$

| | | | |
|---|---|---|---|
| $r_1 = 117.2922$ | | | |
| | $d_1 = 2.0000$ | $n_1 = 1.80518$ | $\nu_1 = 25.43$ |
| $r_2 = 39.5555$ | | | |
| | $d_2 = 8.4705$ | $n_2 = 1.60311$ | $\nu_2 = 60.70$ |
| $r_3 = -195.7503$ | | | |
| | $d_3 = 0.1298$ | | |
| $r_4 = 33.8610$ | | | |
| | $d_4 = 4.3713$ | $n_3 = 1.70154$ | $\nu_3 = 41.24$ |
| $r_5 = 100.0882$ | | | |
| | $d_5 = D_1$ (variable) | | |
| $r_6 = -24.3064$ | | | |
| | $d_6 = 0.9990$ | $n_4 = 1.60311$ | $\nu_4 = 60.70$ |
| $r_7 = 9.0958$ (aspherical surface) | | | |
| | $d_7 = D_2$ (variable) | | |
| $r_8 = -35.0131$ | | | |
| | $d_8 = 1.5037$ | $n_5 = 1.84666$ | $\nu_5 = 23.78$ |
| $r_9 = -24.6748$ | | | |
| | $d_9 = D_3$ (variable) | | |
| $r_{10} = \infty$ (stop) | | | |
| | $d_{10} = 3.1766$ | | |
| $r_{11} = 22.4068$ | | | |
| | $d_{11} = 4.0113$ | $n_6 = 1.74950$ | $\nu_6 = 35.27$ |
| $r_{12} = 159.7938$ | | | |
| | $d_{12} = 9.3162$ | | |
| $r_{13} = -11.7175$ | | | |
| | $d_{13} = 0.7050$ | $n_7 = 1.84666$ | $\nu_7 = 23.78$ |
| $r_{14} = -86.7995$ | | | |
| | $d_{14} = 0.5702$ | | |
| $r_{15} = 19.5096$ | | | |
| | $d_{15} = 3.9003$ | $n_8 = 1.60311$ | $\nu_8 = 60.70$ |
| $r_{16} = -9.8520$ (aspherical surface) | | | |

| f | 8 | 19.6 | 48 |
|---|---|---|---|
| $D_1$ | 2.995 | 20.373 | 30.568 |
| $D_2$ | 4.729 | 14.159 | 4.611 |
| $D_3$ | 32.896 | 6.087 | 5.440 |

(aspherical coefficient)
7th surface $\quad E = -0.27679 \times 10^{-3}$, $F = -0.18251 \times 10^{-6}$
$\quad\quad\quad\quad\quad G = -0.33198 \times 10^{-7}$
16th surface $\quad E = 0.24571 \times 10^{-3}$, $F = 0.13684 \times 10^{-5}$
$\quad\quad\quad\quad\quad G = -0.12825 \times 10^{-9}$ $\left|\dfrac{\Delta x \cdot r}{h \cdot f_W}\right| = 0.117$, $\nu_2 - \nu_3 = 36.9$ $|D_W - D_T|/\Delta D = 4.3 \times 10^{-3}$ $\left|\dfrac{\Delta x \cdot f_{IVB}}{k \cdot f_W}\right| = -0.022$, $HB_I/f_S = -0.22$ $HB_{II}/f_S = -8.6 \times 10^{-3}$, $|f_{I\,II\,III}/f_{IV}| = 1.1$

| Embodiment 3 |
|---|

$f = 9-54$, F/1.6, Maximum image hight = 4.2
$2\omega = 50°-8.9°$

| | | | |
|---|---|---|---|
| $r_1 = 187.9673$ | | | |
| | $d_1 = 2.0000$ | $n_1 = 1.80518$ | $\nu_1 = 25.43$ |
| $r_2 = 56.1581$ | | | |
| | $d_2 = 8.4998$ | $n_2 = 1.60311$ | $\nu_2 = 60.70$ |
| $r_3 = -206.9799$ | | | |
| | $d_3 = 0.0977$ | | |
| $r_4 = 40.1616$ | | | |
| | $d_4 = 4.7997$ | $n_3 = 1.70154$ | $\nu_3 = 41.24$ |
| $r_5 = 125.0393$ | | | |
| | $d_5 = D_1$ (variable) | | |
| $r_6 = -20.8817$ | | | |
| | $d_6 = 0.9985$ | $n_4 = 1.88300$ | $\nu_4 = 40.78$ |
| $r_7 = 16.3829$ (aspherical surface) | | | |
| | $d_7 = D_2$ (variable) | | |
| $r_8 = -38.7876$ (aspherical surface) | | | |
| | $d_8 = 1.5015$ | $n_5 = 1.84666$ | $\nu_5 = 23.78$ |
| $r_9 = -18.1358$ | | | |
| | $d_9 = D_3$ (variable) | | |

-continued

Embodiment 3

| | | | |
|---|---|---|---|
| $r_{10} = \infty$ (stop) | | | |
| | $d_{10} = 0.3367$ | | |
| $r_{11} = 23.8418$ | | | |
| | $d_{11} = 2.2628$ | $n_6 = 1.74950$ | $\nu_6 = 35.27$ |
| $r_{12} = 276.6017$ | | | |
| | $d_{12} = 3.6459$ | | |
| $r_{13} = -12.9267$ | | | |
| | $d_{13} = 1.0011$ | $n_7 = 1.84666$ | $\nu_7 = 23.78$ |
| $r_{14} = -117.0323$ (aspherical surface) | | | |
| | $d_{14} = 0.5699$ | | |
| $r_{15} = 20.4595$ | | | |
| | $d_{15} = 5.4000$ | $n_8 = 1.60311$ | $\nu_8 = 60.70$ |
| $r_{16} = -11.4005$ (aspherical surface) | | | |

| f | 9 | 22 | 54 |
|---|---|---|---|
| $D_1$ | 3.000 | 25.036 | 38.414 |
| $D_2$ | 7.266 | 8.857 | 4.229 |
| $D_3$ | 33.059 | 9.433 | 0.682 |

(aspherical coefficient)
7th surface $\quad E = -0.13166 \times 10^{-3}, F = 0.10206 \times 10^{-5}$
$\qquad G = 0.12415 \times 10^{-7}$
8th surface $\quad E = -0.54128 \times 10^{-5}, F = 0.39408 \times 10^{-6}$
$\qquad G = -0.41593 \times 10^{-8}$
14th surface $\quad E = 0, F = 0, G = -0.58492 \times 10^{-8}$
$\qquad H = -0.78526 \times 10^{-10}, I = 0.14120 \times 10^{-13}$
16th surface $\quad E = 0.18651 \times 10^{-3}, F = -0.25411 \times 10^{-6}$
$\qquad G = 0.13602 \times 10^{-7}$ $\left| \dfrac{\Delta x \cdot r}{h \cdot f_W} \right| = 0.049, \nu_2 - \nu_3 = 17$ $|D_W - D_T|/\Delta D = 0.086, \left| \dfrac{\Delta x \cdot f_{IVB}}{k \cdot f_W} \right| = 0.027$ $HB_I/f_S = -0.20, HB_{II}/f_S = -1.0 \times 10^{-2}$
$|f_{I\,II\,III}/f_{IV}| = 1.6$

Embodiment 4

$f = 9-54$, $F/2.8$, Maximum image hight = 4.2
$2\omega = 50°-8.9°$

| | | | |
|---|---|---|---|
| $r_1 = 134.5978$ | | | |
| | $d_1 = 2.0000$ | $n_1 = 1.80518$ | $\nu_1 = 25.43$ |
| $r_2 = 54.6822$ | | | |
| | $d_2 = 8.4645$ | $n_2 = 1.60311$ | $\nu_2 = 60.70$ |
| $r_3 = -170.0069$ | | | |
| | $d_3 = 0.1250$ | | |
| $r_4 = 38.7960$ | | | |
| | $d_4 = 4.4327$ | $n_3 = 1.60311$ | $\nu_3 = 60.70$ |
| $r_5 = 124.0763$ | | | |
| | $d_5 = D_1$ (variable) | | |
| $r_6 = -18.2073$ (aspherical surface) | | | |
| | $d_6 = 0.9988$ | $n_4 = 1.60311$ | $\nu_4 = 60.70$ |
| $r_7 = 12.0955$ | | | |
| | $d_7 = D_2$ (variable) | | |
| $r_8 = -35.2295$ | | | |
| | $d_8 = 1.4523$ | $n_5 = 1.84666$ | $\nu_5 = 23.78$ |
| $r_9 = -23.5161$ | | | |
| | $d_9 = D_3$ (variable) | | |
| $r_{10} = \infty$ (stop) | | | |
| | $d_{10} = 2.9726$ | | |
| $r_{11} = 22.2896$ (aspherical surface) | | | |
| | $d_{11} = 4.3361$ | $n_6 = 1.74950$ | $\nu_6 = 35.27$ |
| $r_{12} = 63.5937$ | | | |
| | $d_{12} = 12.0062$ | | |
| $r_{13} = -14.6718$ | | | |
| | $d_{13} = 0.7260$ | $n_7 = 1.84666$ | $\nu_7 = 23.78$ |
| $r_{14} = -173.6711$ | | | |
| | $d_{14} = 0.5703$ | | |
| $r_{15} = 26.0755$ | | | |
| | $d_{15} = 3.3425$ | $n_8 = 1.60311$ | $\nu_8 = 60.70$ |
| $r_{16} = -9.8381$ (aspherical surface) | | | |

| f | 9 | 22 | 54 |
|---|---|---|---|
| $D_1$ | 2.997 | 22.891 | 34.871 |
| $D_2$ | 5.718 | 13.148 | 4.599 |

-continued

Embodiment 4

| | | | |
|---|---|---|---|
| $D_3$ | 34.536 | 7.212 | 3.781 |

(aspherical coefficient)
6th surface    $E = 0.17013 \times 10^{-3}$, $F = -0.49325 \times 10^{-6}$
               $G = 0.51169 \times 10^{-9}$
11th surface   $E = -0.66259 \times 10^{-5}$, $F = -0.13915 \times 10^{-5}$
               $G = 0.35898 \times 10^{-7}$
16th surface   $E = 0.18039 \times 10^{-3}$, $F = 0.18940 \times 10^{-5}$
               $G = 0.78182 \times 10^{-8}$ $\left|\dfrac{\Delta x \cdot r}{h \cdot f_W}\right| = 0.124$, $\nu_2 - \nu_3 = 36.9$ $|D_W - D_T|/\Delta D = 0.035$, $\left|\dfrac{\Delta x \cdot f_{IVB}}{k \cdot f_W}\right| = 0.023$ $HB_I/f_S = -0.21$, $HB_{II}/f_S = -1.1 \times 10^{-2}$
$|f_{I\,II\,III}/f_{IV}| = 1.1$

Embodiment 5

$f = 9-54$, F/2.8, Maximum image hight = 4.2
$2\omega = 50°-8.9°$

| | | | |
|---|---|---|---|
| $r_1 = 44.1613$ | | | |
| | $d_1 = 2.0000$ | $n_1 = 1.80518$ | $\nu_1 = 25.43$ |
| $r_2 = 29.3748$ | | | |
| | $d_2 = 11.9992$ | $n_2 = 1.56965$ | $\nu_2 = 49.33$ |
| $r_3 = -1396.0868$ | | | |
| | $d_3 = D_1$ (variable) | | |
| $r_4 = -72.4728$ | | | |
| | $d_4 = 1.4994$ | $n_3 = 1.88300$ | $\nu_3 = 40.78$ |
| $r_5 = 18.5040$ (aspherical surface) | | | |
| | $d_5 = D_2$ (variable) | | |
| $r_6 = 25.5094$ | | | |
| | $d_6 = 2.5000$ | $n_4 = 1.84666$ | $\nu_4 = 23.78$ |
| $r_7 = 52.2879$ | | | |
| | $d_7 = D_3$ (variable) | | |
| $r_8 = \infty$ (stop) | | | |
| | $d_8 = 1.4897$ | | |
| $r_9 = 7.6610$ | | | |
| | $d_9 = 7.1234$ | $n_5 = 1.74950$ | $\nu_5 = 35.27$ |
| $r_{10} = 13.3898$ | | | |
| | $d_{10} = 1.0000$ | | |
| $r_{11} = -9.0159$ | | | |
| | $d_{11} = 0.4722$ | $n_6 = 1.84666$ | $\nu_6 = 23.78$ |
| $r_{12} = 10.6172$ | | | |
| | $d_{12} = 1.5614$ | | |
| $r_{13} = 73.9218$ | | | |
| | $d_{13} = 2.1999$ | $n_7 = 1.60311$ | $\nu_7 = 60.70$ |
| $r_{14} = -8.9871$ | | | |
| | $d_{14} = 0.2250$ | | |
| $r_{15} = 8.5874$ | | | |
| | $d_{15} = 1.7975$ | $n_8 = 1.60311$ | $\nu_8 = 60.70$ |
| $r_{16} = 72.2936$ (aspherical surface) | | | |

| f | 9 | 22 | 54 |
|---|---|---|---|
| $D_1$ | 2.489 | 30.903 | 50.653 |
| $D_2$ | 2.814 | 8.389 | 1.085 |
| $D_3$ | 48.935 | 14.945 | 2.500 |

(aspherical coefficient)
5th surface    $E = -0.16601 \times 10^{-4}$, $F = -0.83828 \times 10^{-7}$
               $G = 0.10232 \times 10^{-9}$
16th surface   $E = 0.19124 \times 10^{-3}$, $F = 0.36872 \times 10^{-5}$
               $G = -0.51573 \times 10^{-7}$ $\left|\dfrac{\Delta x \cdot r}{h \cdot f_W}\right| = 0.064$, $\nu_2 - \nu_3 = 17$ $|D_W - D_T|/\Delta D = 0.036$, $\left|\dfrac{\Delta x \cdot f_{IVB}}{k \cdot f_W}\right| = 0.006$ $HB_I/f_S = -0.42$, $HB_{II}/f_S = -5.7 \times 10^{-3}$
$|f_{I\,II\,III}/f_{IV}| = 2.2$

| Embodiment 6 |
|---| f = 9-54, F/2.8, Maximum image hight = 4.2
2ω = 50°-8.9°

| | | | |
|---|---|---|---|
| $r_1 = 118.1254$ | | | |
| | $d_1 = 2.0000$ | $n_1 = 1.80518$ | $\nu_1 = 25.43$ |
| $r_2 = 46.2598$ | | | |
| | $d_2 = 8.4086$ | $n_2 = 1.60311$ | $\nu_2 = 60.70$ |
| $r_3 = -373.7051$ | | | |
| | $d_3 = 0.1046$ | | |
| $r_4 = 36.3301$ | | | |
| | $d_4 = 4.5000$ | $n_3 = 1.70154$ | $\nu_3 = 41.24$ |
| $r_5 = 103.0265$ | | | |
| | $d_5 = D_1$ (variable) | | |
| $r_6 = -24.8282$ | | | |
| | $d_6 = 0.6877$ | $n_4$ 1.88300 | $\nu_4 = 40.78$ |
| $r_7 = 13.3240$ (aspherical surface) | | | |
| | $d_7 = D_2$ (variable) | | |
| $r_8 = -37.8187$ | | | |
| | $d_8 = 1.5000$ | $n_5 = 1.84666$ | $\nu_5 = 23.78$ |
| $r_9 = -16.8760$ | | | |
| | $d_9 = D_3$ (variable) | | |
| $r_{10} = \infty$ (stop) | | | |
| | $d_{10} = 10.2864$ | | |
| $r_{11} = -8.8223$ | | | |
| | $d_{11} = 0.9000$ | $n_6 = 1.84666$ | $\nu_6 = 23.78$ |
| $r_{12} = -18.8043$ | | | |
| | $d_{12} = 0.5693$ | | |
| $r_{13} = 23.8366$ | | | |
| | $d_{13} = 4.0000$ | $n_7 = 1.60311$ | $\nu_7 = 60.70$ |
| $r_{14} = -9.5885$ (aspherical surface) | | | |

| f | 9 | 22 | 54 |
|---|---|---|---|
| $D_1$ | 3.000 | 24.585 | 36.300 |
| $D_2$ | 10.432 | 9.754 | 3.852 |
| $D_3$ | 28.629 | 7.722 | 1.909 |

(aspherical coefficient)
7th surface $\quad E = -0.10400 \times 10^{-3}, F = -0.62600 \times 10^{-7}$
$\quad\quad\quad\quad\quad G = -0.28412 \times 10^{-8}$
14th surface $\quad E = 0.21390 \times 10^{-3}, F = 0.84424 \times 10^{-6}$
$\quad\quad\quad\quad\quad G = 0.14340 \times 10^{-7}$ $\left|\dfrac{\Delta x \cdot r}{h \cdot f_W}\right| = 0.034, \nu_2 - \nu_3 = 17$ $|D_W - D_T|/\Delta D = 0.197, \left|\dfrac{\Delta x \cdot f_{IVB}}{k \cdot f_W}\right| = 0.043$
$HB_I/f_S = -0.19, HB_{II}/f_S = -5.7 \times 10^{-3}$
$|f_{I\,II\,III}/f_{IV}| = 2.2$

| Embodiment 7 |
|---| f = 9-54, F/2.8, Maximum image hight = 4.2
2ω = 50°-8.9°

| | | | |
|---|---|---|---|
| $r_1 = 47.2936$ | | | |
| | $d_1 = 1.9999$ | $n_1 = 1.80518$ | $\nu_1 = 25.43$ |
| $r_2 = 29.2889$ | | | |
| | $d_2 = 11.9987$ | $n_2 = 1.56965$ | $\nu_2 = 49.33$ |
| $r_3 = -237.4779$ | | | |
| | $d_3 = D_1$ (variable) | | |
| $r_4 = -32.5041$ | | | |
| | $d_4 = 1.3398$ | $n_3 = 1.88300$ | $\nu_3 = 40.78$ |
| $r_5 = 22.9554$ (aspherical surface) | | | |
| | $d_5 = D_2$ (variable) | | |
| $r_6 = 1181.7011$ | | | |
| | $d_6 = 2.4984$ | $n_4 = 1.84666$ | $\nu_4 = 23.78$ |
| $r_7 = -48.5476$ | | | |
| | $d_7 = D_3$ (variable) | | |
| $r_8 = \infty$ (stop) | | | |
| | $d_8 = 1.7728$ | | |
| $r_9 = 7.6872$ | | | |
| | $d_9 = 7.0910$ | $n_5 = 1.74950$ | $\nu_5 = 35.27$ |
| $r_{10} = -59.3248$ | | | |
| | $d_{10} = 0.9925$ | | |
| $r_{11} = -8.3538$ | | | |
| | $d_{11} = 0.3666$ | $n_6 = 1.84666$ | $\nu_6 = 23.78$ |
| $r_{12} = 6.3068$ (aspherical surface) | | | |
| | $d_{12} = 1.8108$ | | |

-continued

Embodiment 7

$r_{13} = 10.6274$
$\quad\quad d_{13} = 3.1079 \quad\quad n_7 = 1.60311 \quad \nu_7 = 60.70$
$r_{14} = -8.0215$ (aspherical surface)

| f | 9 | 22 | 54 |
|---|---|---|---|
| $D_1$ | 2.454 | 30.162 | 49.345 |
| $D_2$ | 2.260 | 8.033 | 2.311 |
| $D_3$ | 48.186 | 14.434 | 1.263 |

(aspherical coefficient)
5th surface $\quad E = -0.38647 \times 10^{-4}, F = -0.11873 \times 10^{-6}$
$\quad\quad\quad\quad G = 0.53843 \times 10^{-9}$
12th surface $\quad E = 0.75376 \times 10^{-5}, F = -0.22689 \times 10^{-4}$
$\quad\quad\quad\quad G = -0.13258 \times 10^{-5}$
14th surface $\quad E = -0.26537 \times 10^{-3}, F = 0.55922 \times 10^{-5}$
$\quad\quad\quad\quad G = 0.29573 \times 10^{-6}$ $\left| \dfrac{\Delta x \cdot r}{h \cdot f_W} \right| = 0.101, \nu_2 - \nu_3 = 17$ $|D_W - D_T|/\Delta D = 1.09 \times 10^{-3}, \left| \dfrac{\Delta x \cdot f_{IVB}}{k \cdot f_W} \right| = 0.005$ $HB_I/f_S = -0.36, HB_{II}/f_S = -1.3 \times 10^{-2}$
$|f_{I\,II\,III}/f_{IV}| = 1.9$

Embodiment 8

$f = 10-40, F/2.8$, Maximum image hight = 4.2
$2\omega = 45.6°-12.0°$ $r_1 = 36.2410$
$\quad\quad d_1 = 2.0000 \quad\quad n_1 = 1.80518 \quad \nu_1 = 25.43$
$r_2 = 23.3432$
$\quad\quad d_2 = 2.2666$
$r_3 = 25.9015$
$\quad\quad d_3 = 9.7002 \quad\quad n_2 = 1.60729 \quad \nu_2 = 49.19$
$r_4 = -104.5797$
$\quad\quad d_4 = D_1$ (variable)
$r_5 = -20.3714$
$\quad\quad d_5 = 0.6877 \quad\quad n_3 = 1.86300 \quad \nu_3 = 41.53$
$r_6 = 16.7180$ (aspherical surface)
$\quad\quad d_6 = D_2$ (variable)
$r_7 = -38.4740$
$\quad\quad d_7 = 2.3071 \quad\quad n_4 = 1.84666 \quad \nu_4 = 23.78$
$r_8 = -17.0188$
$\quad\quad d_8 = D_3$ (variable)
$r_9 = \infty$ (stop)
$\quad\quad d_9 = 9.3104$
$r_{10} = -7.4873$
$\quad\quad d_{10} = 0.7766 \quad\quad n_5 = 1.84666 \quad \nu_5 = 23.78$
$r_{11} = -14.0521$ (aspherical surface)
$\quad\quad d_{11} = 0.5499$
$r_{12} = 29.3300$
$\quad\quad d_{12} = 4.2147 \quad\quad n_6 = 1.60311 \quad \nu_6 = 60.70$
$r_{13} = -8.6399$ (aspherical surface)

| f | 9 | 20 | 40 |
|---|---|---|---|
| $D_1$ | 3.024 | 19.876 | 30.578 |
| $D_2$ | 7.992 | 7.252 | 3.302 |
| $D_3$ | 23.402 | 7.291 | 0.539 |

(aspherical coefficient)
6th surface $\quad E = -0.94663 \times 10^{-4}, F = 0.28317 \times 10^{-6}$
$\quad\quad\quad\quad G = -0.28664 \times 10^{-9}, H = -0.96758 \times 10^{-10}$
11th surface $\quad E = 0, F = 0, G = 0.89389 \times 10^{-7}$
$\quad\quad\quad\quad H = -0.23646 \times 10^{-8}$
13th surface $\quad E = 0.23731 \times 10^{-3}, F = 0.12365 \times 10^{-5}$
$\quad\quad\quad\quad G = -0.55734 \times 10^{-9}, H = 0.54788 \times 10^{-9}$ $\left| \dfrac{\Delta x \cdot r}{h \cdot f_W} \right| = 0.014, \nu_2 - \nu_3 = 17.8$ $|D_W - D_T|/\Delta D = 0.170, \left| \dfrac{\Delta x \cdot f_{IVB}}{k \cdot f_W} \right| = 0.007$ -continued

Embodiment 8

$HB_I/f_S = -0.21$, $HB_{II}/f_S = -8.3 \times 10^{-3}$
$|f_{I\,II\,III}/f_{IV}| = 2.6$

Embodiment 9 f = 9–54, F/2.8, Maximum image hight = 4.2
$2\omega = 50.0°-8.9°$

| | | | |
|---|---|---|---|
| $r_1 = 40.6410$ | | | |
| | $d_1 = 2.0000$ | $n_1 = 1.80518$ | $\nu_1 = 25.43$ |
| $r_2 = 25.6050$ | | | |
| | $d_2 = 2.8780$ | | |
| $r_3 = 28.2162$ | | | |
| | $d_3 = 10.4998$ | $n_2 = 1.60729$ | $\nu_2 = 49.19$ |
| $r_4 = -129.9440$ | | | |
| | $d_4 = D_1$ (variable) | | |
| $r_5 = -19.4397$ | | | |
| | $d_5 = 0.6877$ | $n_3 = 1.86300$ | $\nu_3 = 41.53$ |
| $r_6 = 17.7928$ (aspherical surface) | | | |
| | $d_6 = D_2$ (variable) | | |
| $r_7 = -39.3284$ (aspherical surface) | | | |
| | $d_7 = 2.2979$ | $n_4 = 1.84666$ | $\nu_4 = 23.78$ |
| $r_8 = -17.9568$ | | | |
| | $d_8 = D_3$ (variable) | | |
| $r_9 = \infty$ (stop) | | | |
| | $d_9 = 13.0428$ | | |
| $r_{10} = -9.4649$ | | | |
| | $d_{10} = 0.9000$ | $n_5 = 1.84666$ | $\nu_5 = 23.78$ |
| $r_{11} = -17.8283$ (aspherical surface) | | | |
| | $d_{11} = 0.2771$ | | |
| $r_{12} = 28.7807$ | | | |
| | $d_{12} = 3.9688$ | $n_6 = 1.60311$ | $\nu_6 = 60.70$ |
| $r_{13} = -10.2090$ (aspherical surface) | | | |

| f | 9 | 22 | 54 |
|---|---|---|---|
| $D_1$ | 2.515 | 26.524 | 40.381 |
| $D_2$ | 8.430 | 8.673 | 3.299 |
| $D_3$ | 33.274 | 9.022 | 0.539 |

(aspherical coefficient)
6th surface  $E = -0.14161 \times 10^{-3}$, $F = 0.87747 \times 10^{-6}$
  $G = -0.12202 \times 10^{-7}$
7th surface  $E = -0.24592 \times 10^{-4}$, $F = 0.54390 \times 10^{-6}$
  $G = 0.76752 \times 10^{-8}$
11th surface  $E = 0$, $F = 0$, $G = 0.41303 \times 10^{-7}$
  $H = -0.70272 \times 10^{-9}$
13th surface  $E = 0.17675 \times 10^{-3}$, $F = 0.41044 \times 10^{-6}$
  $G = -0.18538 \times 10^{-7}$ $\left|\dfrac{\Delta x \cdot r}{h \cdot f_W}\right| = 0.070$, $\nu_2 - \nu_3 = 17.8$ $|D_W - D_T|/\Delta D = 0.135$, $\left|\dfrac{\Delta x \cdot f_{IVB}}{k \cdot f_W}\right| = 0.030$ $HB_I/f_S = -0.18$, $HB_{II}/f_S = -8.0 \times 10^{-3}$
$|f_{I\,II\,III}/f_{IV}| = 1.9$

Embodiment 10 f = 9–45, F/2.8, Maximum image hight = 4.2
$2\omega = 50.0°-10.7°$

| | | | |
|---|---|---|---|
| $r_1 = 36.1613$ | | | |
| | $d_1 = 2.0000$ | $n_1 = 1.80518$ | $\nu_1 = 25.43$ |
| $r_2 = 23.6799$ | | | |
| | $d_2 = 2.2210$ | | |
| $r_3 = 25.5077$ | | | |
| | $d_3 = 9.2200$ | $n_2 = 1.60729$ | $\nu_2 = 49.19$ |
| $r_4 = -181.6475$ | | | |
| | $d_4 = D_1$ (variable) | | |
| $r_5 = -23.2690$ | | | |
| | $d_5 = 0.9996$ | $n_3 = 1.88300$ | $\nu_3 = 40.78$ |
| $r_6 = 14.6860$ (aspherical surface) | | | |
| | $d_6 = D_2$ (variable) | | |
| $r_7 = -33.0589$ (aspherical surface) | | | |

-continued

Embodiment 10

| | | | | |
|---|---|---|---|---|
| $r_8 = -16.2936$ | $d_7 = 2.5031$ | | $n_4 = 1.84666$ | $\nu_4 = 23.78$ |
| | $d_8 = D_3$ (variable) | | | |
| $r_9 = \infty$ (stop) | | | | |
| | $d_9 = 11.8234$ | | | |
| $r_{10} = 40.4965$ | | | | |
| | $d_{10} = 0.9998$ | | $n_5 = 1.84666$ | $\nu_5 = 23.78$ |
| $r_{11} = 15.7317$ | | | | |
| | $d_{11} = 0.5685$ | | | |
| $r_{12} = 11.2820$ | | | | |
| | $d_{12} = 7.5639$ | | $n_6 = 1.60311$ | $\nu_6 = 60.70$ |
| $r_{13} = -19.6041$ (aspherical surface) | | | | |

| f | 9 | 20 | 45 |
|---|---|---|---|
| $D_1$ | 3.243 | 23.018 | 35.638 |
| $D_2$ | 6.089 | 6.968 | 3.450 |
| $D_3$ | 32.358 | 11.704 | 2.601 |

(aspherical coefficient)
6th surface $\quad E = -0.13336 \times 10^{-3}, F = 0.91871 \times 10^{-6}$
$\qquad G = -0.12263 \times 10^{-7}$
7th surface $\quad E = -0.24630 \times 10^{-4}, F = 0.62366 \times 10^{-6}$
$\qquad G = -0.62821 \times 10^{-8}$
13th surface $\quad E = 0.13312 \times 10^{-3}, F = 0.40180 \times 10^{-6}$
$\qquad G = 0.19204 \times 10^{-7}$ $$\left| \frac{\Delta x \cdot r}{h \cdot f_W} \right| = 0.052, \nu_2 - \nu_3 = 17$$

$$|D_W - D_T|/\Delta D = 0.082, \left| \frac{\Delta x \cdot f_{IVB}}{k \cdot f_W} \right| = 0.017$$

$HB_I/f_S = -0.23, HB_{II}/f_S = -1.0 \times 10^{-2}$
$|f_{I\,II\,III}/f_{IV}| = 1.7$ wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements and the reference symbols $\nu_1, \nu_2, \ldots$ represent Abbe's number of the respective lens elements.

Further, when the optical axis is taken as the x axis and the arbitrary direction perpendicular to the optical axis is taken as the y axis, the aspherical surfaces used in the individual Embodiments are expressed by the following formula:

$$y = \frac{x^2/r}{1 + \sqrt{1 - (x/r)^2}} + Ex^4 + Fx^6 + Gx^8 + \ldots$$

wherein the reference symbol r represents paraxial radius of curvature, and the reference symbols E, F, G, ... designate the coefficients of aspherical surface having the values listed in the numerical data.

Out of the Embodiments described above, the Embodiment 1 has the composition illustrated in FIG. 1 wherein the first lens unit comprises a cemented doublet consisting of a negative meniscus lens element having a concave surface on the image side and a biconvex lens element, and a positive meniscus lens component having a convex surface on the object side which are arranged in the order from the object side, the second lens unit consists of a biconcave lens component having an aspherical surface of the image side, the third lens unit consists of a positive meniscus lens component having a convex surface on the image side, and the fourth lens unit consists of a biconvex lens component, a biconcave lens component and a biconvex lens component having an aspherical surface on the image side which are arranged in the order from the object side. Aberration characteristics of the Embodiment 1 at the wide position, the intermediate focal length and the tele position are illustrated in FIG. 11, FIG. 12 and FIG. 13 respectively.

Figure 2:
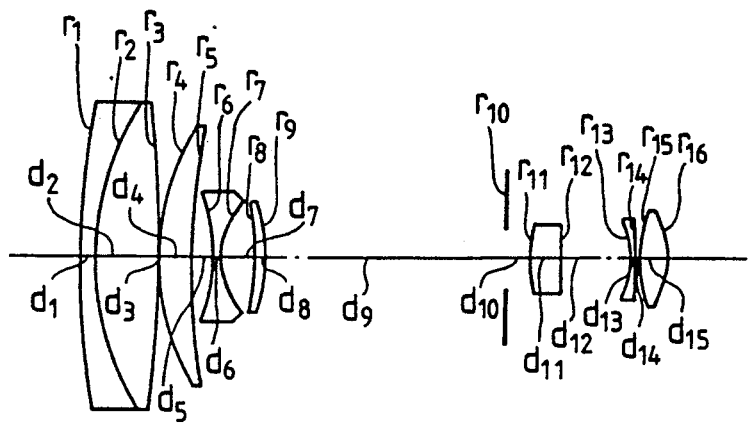
Figure 15:
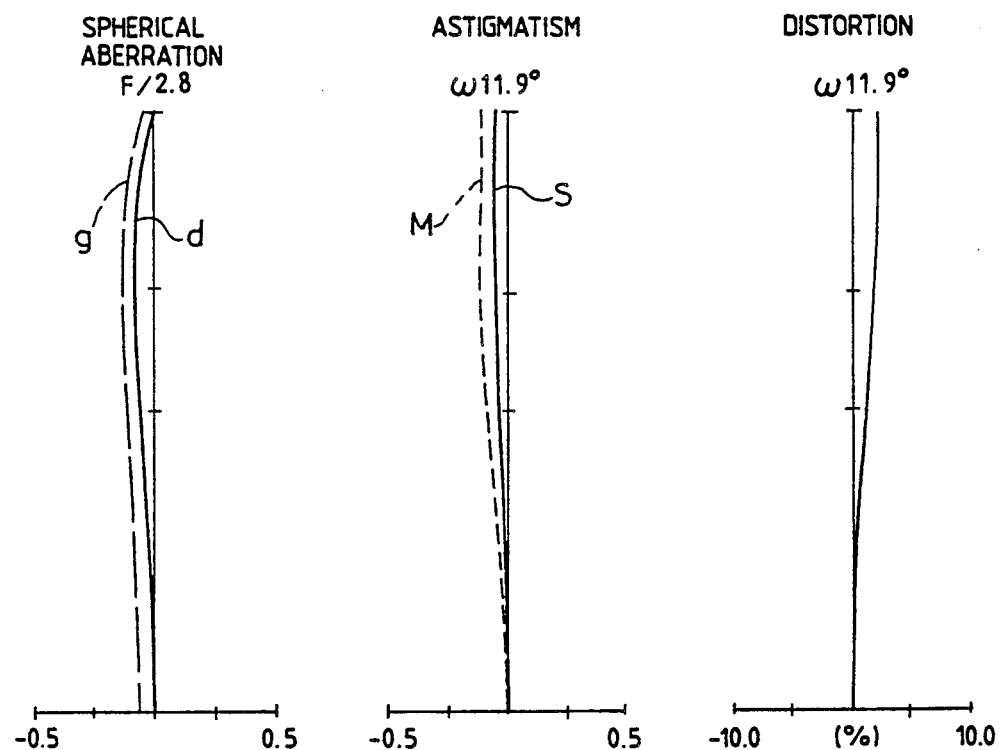
Figure 16:
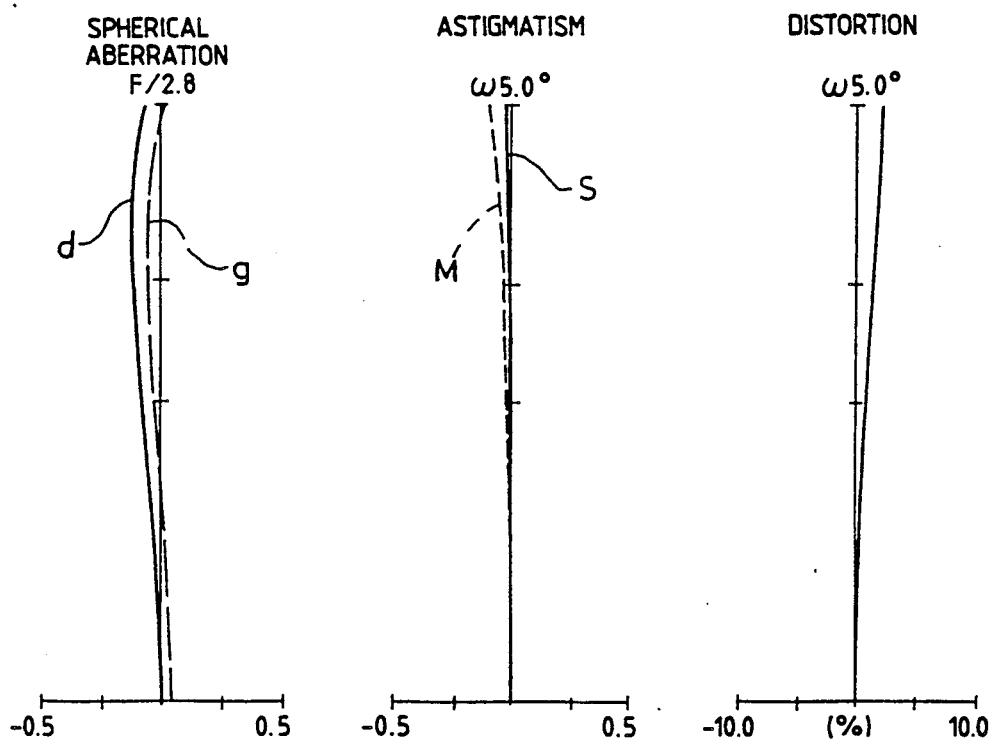

The Embodiment 2 of the present invention has the composition shown in FIG. 2 wherein the first lens unit, the second lens unit and the third lens unit have the same compositions as those in the Embodiment 1 described above. The fourth lens unit comprises a positive meniscus lens component having a convex surface on the object side, a negative meniscus lens component having a concave surface on the object side and a biconvex lens component having an aspherical surface on the image side which are arranged in the order from the object side. Aberration characteristics of the Embodiment 2 at the wide position, the intermediate focal length and the tele position thereof are illustrated in FIG. 14, FIG. 15 and FIG. 16 respectively.

Figure 3:
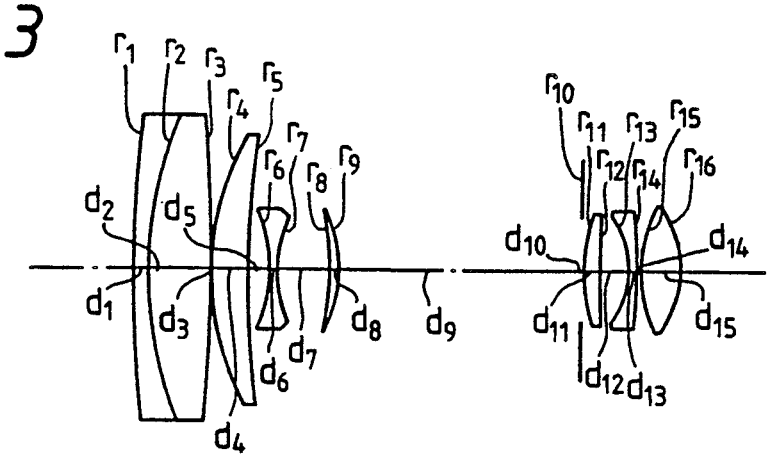
Figure 19:
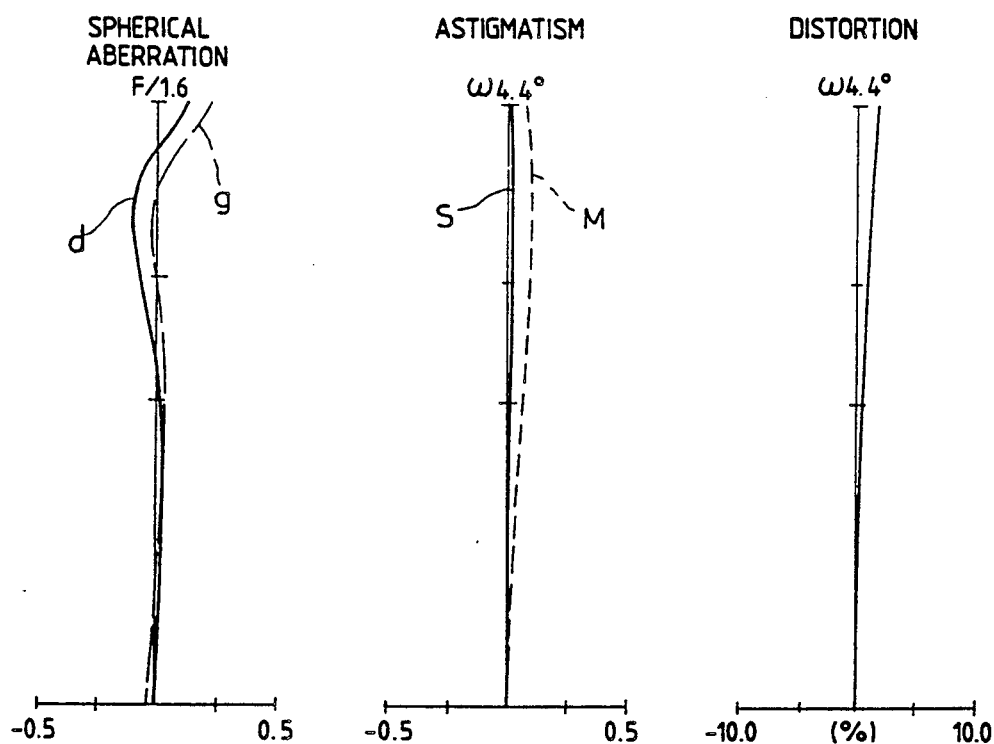

The Embodiment 3 of the present invention has the composition shown in FIG. 3 similar to that of the Embodiment 2, except for the object side surface of the third lens unit and the image side surface of the negative lens component in the fourth lens unit which are designed as aspherical surfaces for obtaining a large aperture ratio. The aspherical surface used on the third lens unit is adopted for preventing astigmatism from being varied by changing focal length. Further, the aspherical surface used on the negative lens component in the fourth lens unit is adopted especially for correcting coma of high orders. Aberration characteristics of the Embodiment 3 at the wide position, the intermediate focal length and the tele position thereof are illustrated in FIG. 17, FIG. 18 and FIG. 19 respectively.

Figure 4:
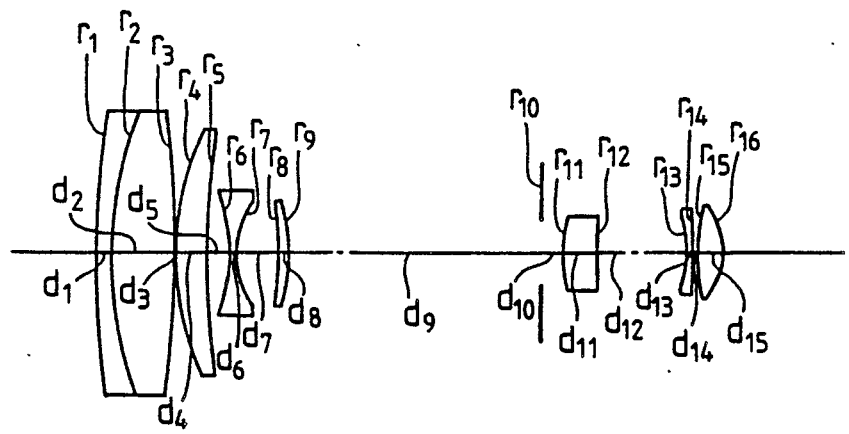
Figure 20:
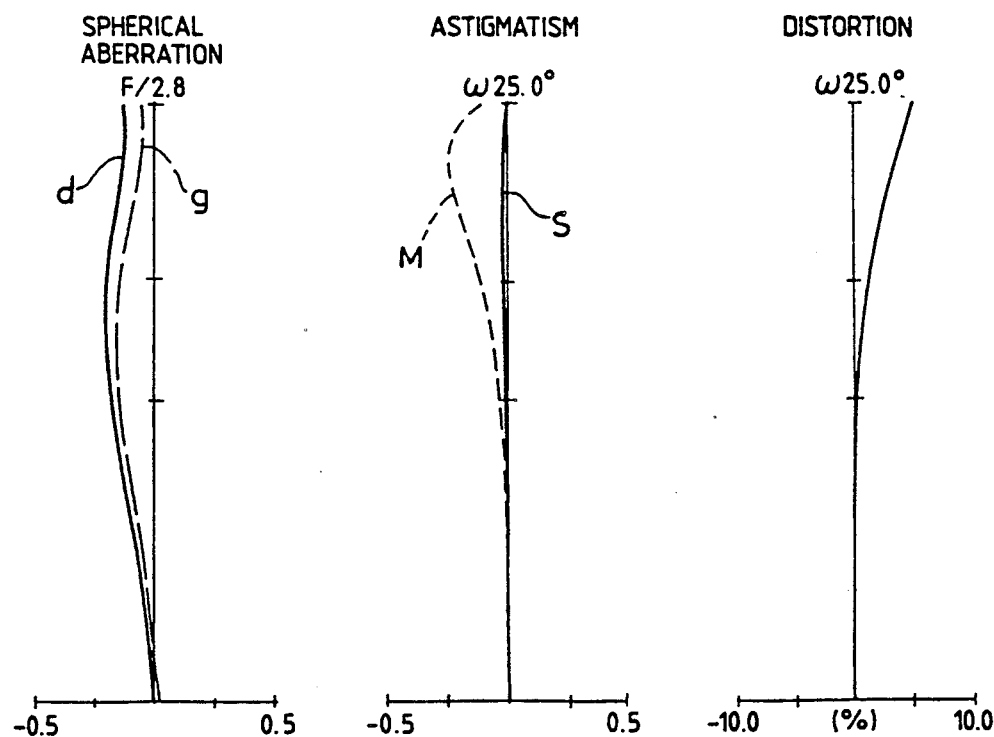

The Embodiment 4 of the present invention has the composition shown in FIG. 4 wherein the first lens unit and the third lens unit have the same compositions as those in the Embodiment 2. The second lens unit consists of a biconcave lens component having an aspherical surface on the object side. The fourth lens unit comprises a positive meniscus lens component having an aspherical convex surface on the object side, a negative meniscus lens component having a concave surface on the object side and a biconvex lens component having an aspherical surface on the image side which are arranged in the order from the object side. The aspherical surface of the positive meniscus lens component is adopted for correcting spherical aberration and coma more favorably. Aberration characteristics of the Embodiment 4 at the wide position, the intermediate focal length and the tele position thereof are illustrated in FIG. 20, FIG. 21 and FIG. 22 respectively.

Figure 5:
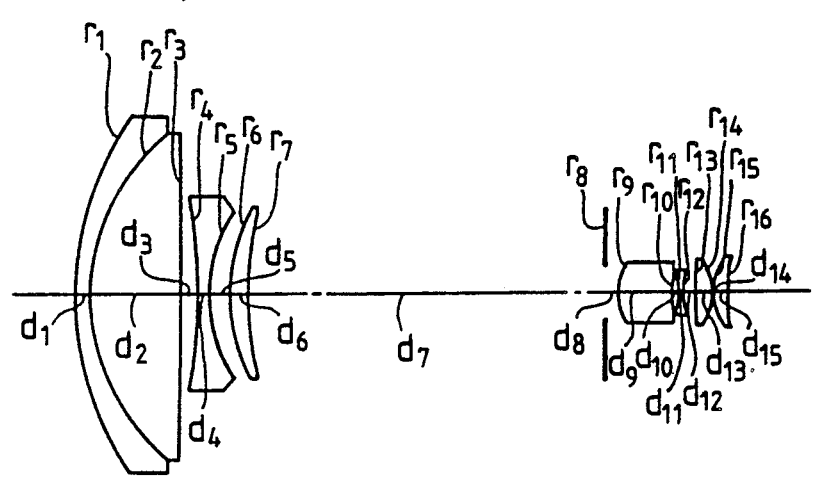
Figure 25:
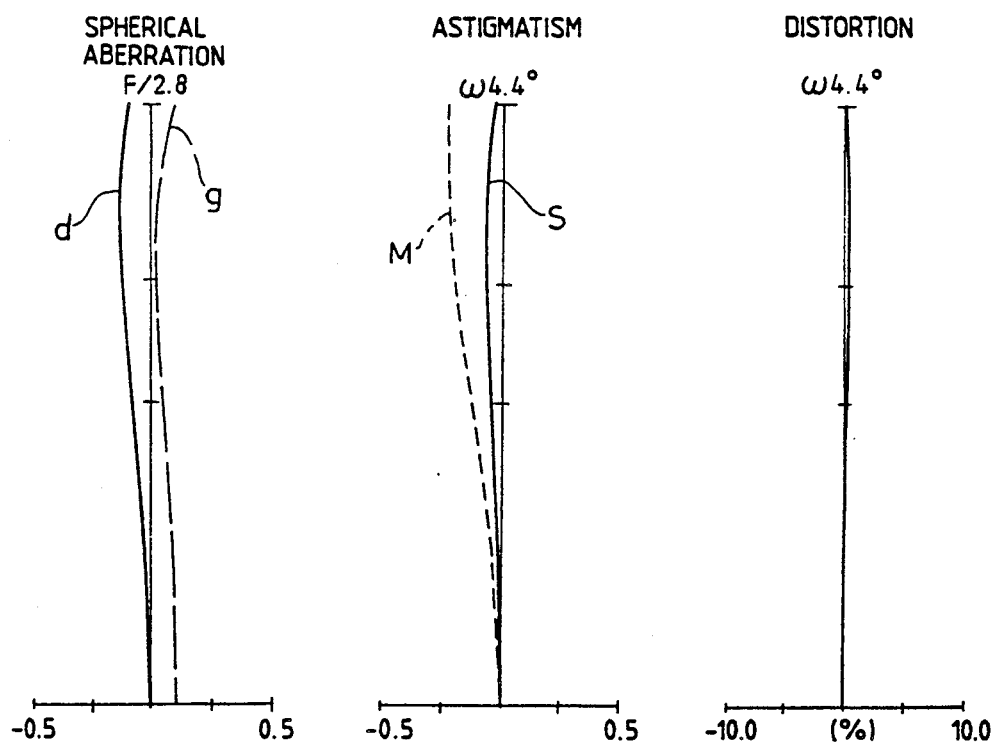

The Embodiment 5 of the present invention has the composition shown in FIG. 5 wherein the first lens unit comprises a cemented doublet consisting of a negative meniscus lens element having a concave surface on the image side and a biconvex lens element arranged in the order from the object side, the second lens unit comprises a bioconcave lens component having an aspherical surface on the image side, the third lens unit comprises a positive meniscus lens component having a convex surface on the object side, and the fourth lens unit comprises a positive meniscus lens component having a convex surface on the object side, a biconcave lens component, a biconvex lens component and a positive meniscus lens component having an aspherical surface on the image side and a convex surface on the object side which are arranged in the order from the object side. Aberration characteristics of the Embodiment 5 at the wide position, the intermediate focal length and the tele position thereof are visualized in FIG. 23, FIG. 24 and FIG. 25 respectively.

Figure 6:
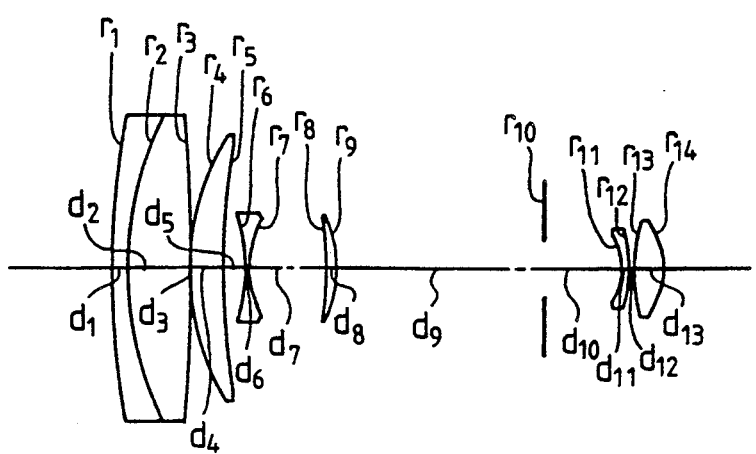
Figure 26:
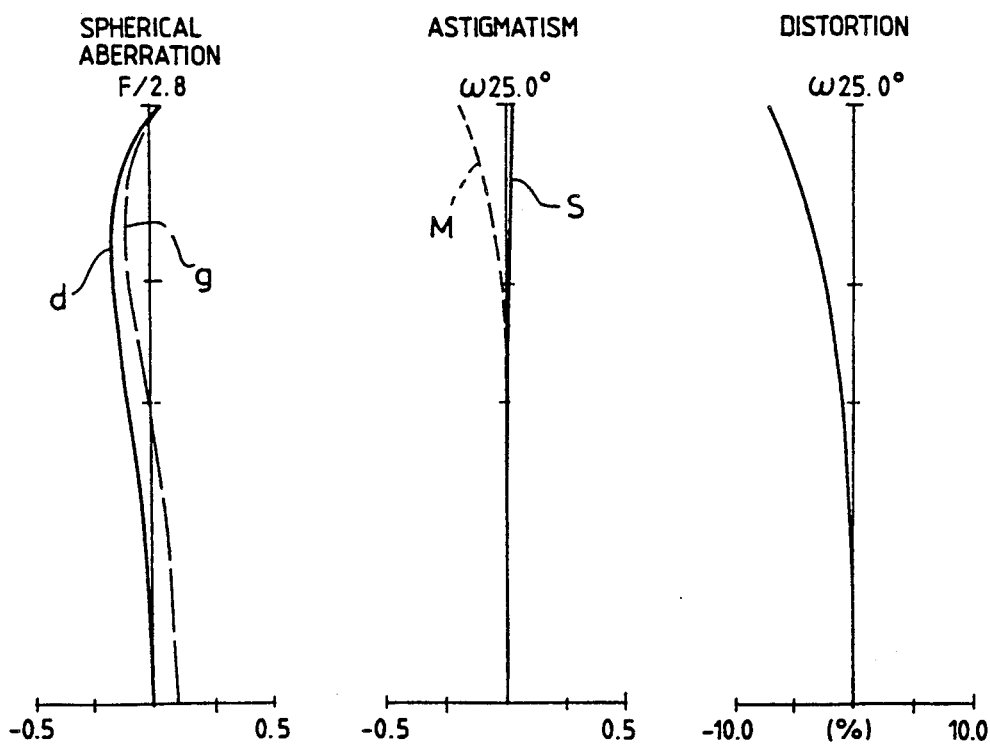
FIG. 26 through FIG. 28 show curves illustrating aberration characteristics of the Embodiment 6 of the present invention.
Figure 27:
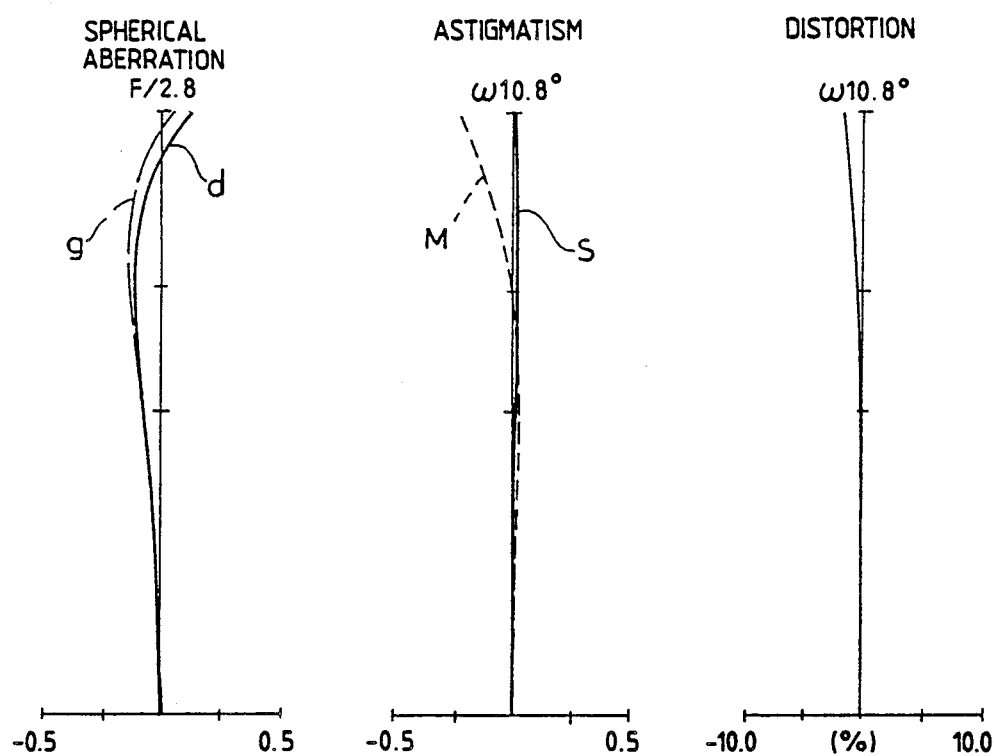
Figure 28:
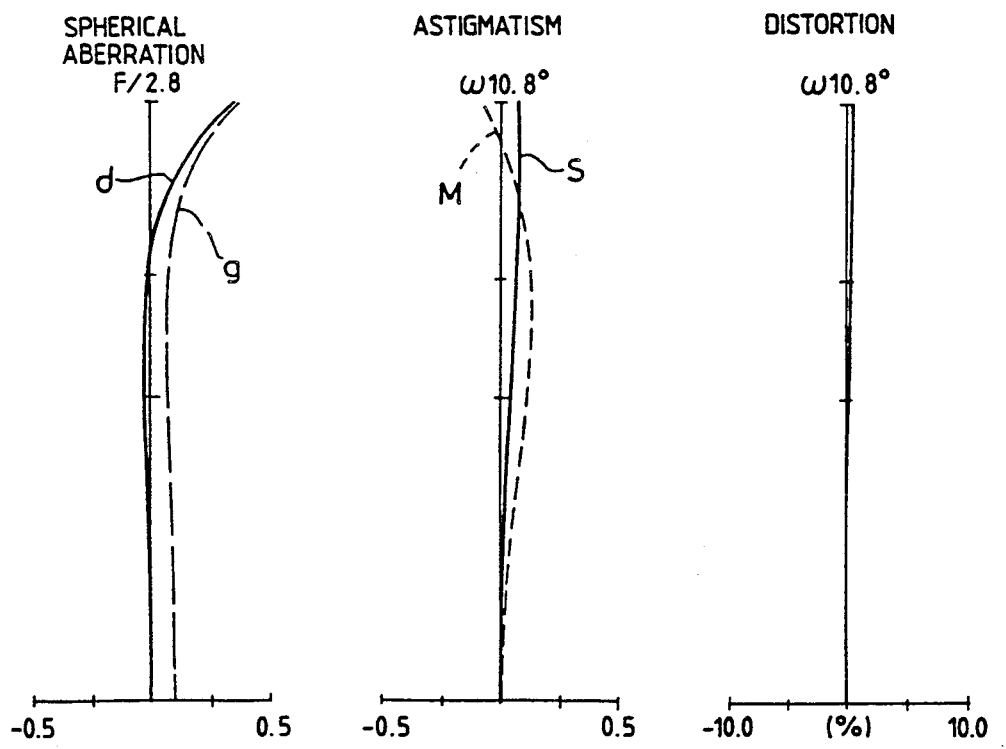

The Embodiment 6 of the present invention has the composition shown in FIG. 6 wherein the first lens unit, the second lens unit and the third lens unit have the same compositions as those used in the Embodiment 2. The fourth lens unit comprises a negative meniscus lens component having a concave surface on the object side and a biconvex lens component having an aspherical surface on the image side which are arranged in the order from the object side. Aberration characteristics of the Embodiment 6 at the wide position, the intermediate focal length and the tele position thereof are visualized in FIG. 26, FIG. 27 and FIG. 28 respectively.

Figure 7:
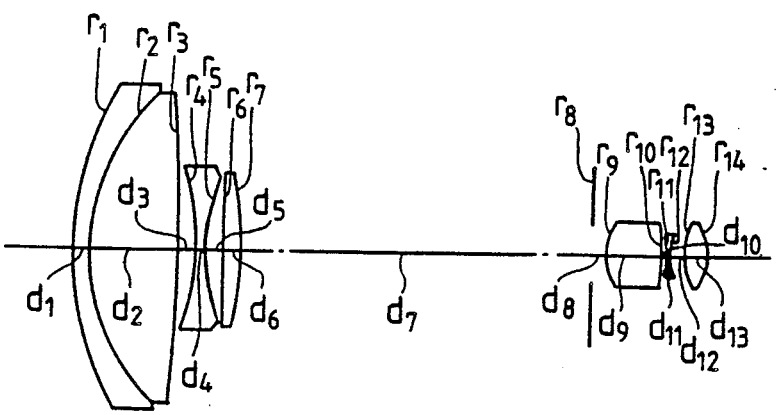
Figure 29:
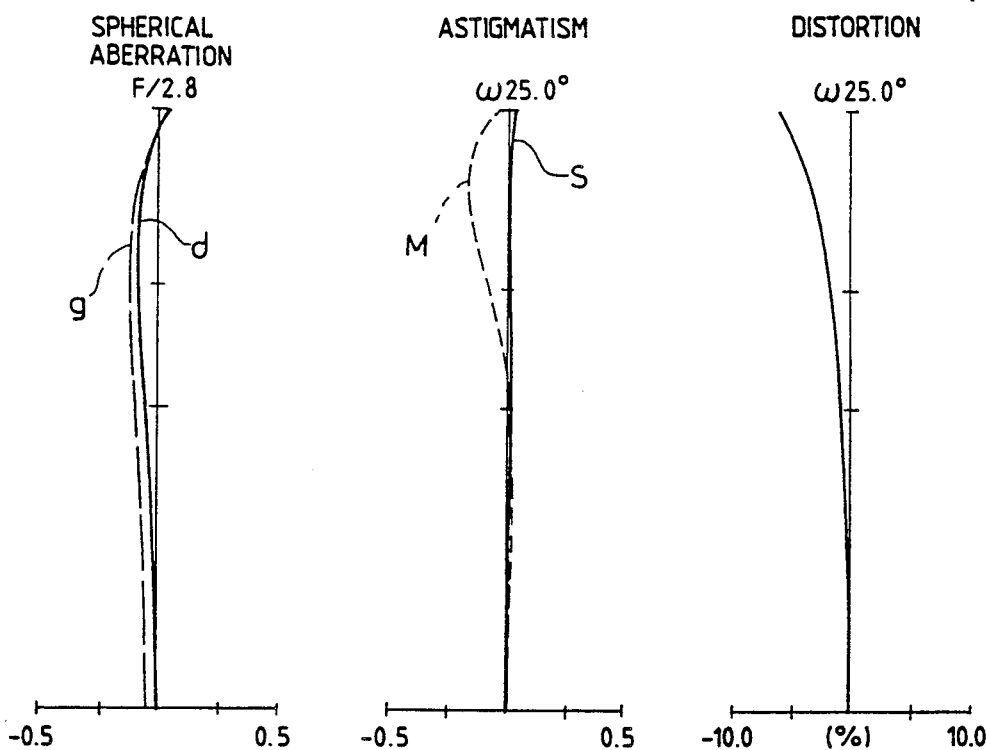
FIG. 29 through FIG. 31 show curves illustrating aberration characteristics of the Embodiment 7 of the present invention.
Figure 30:
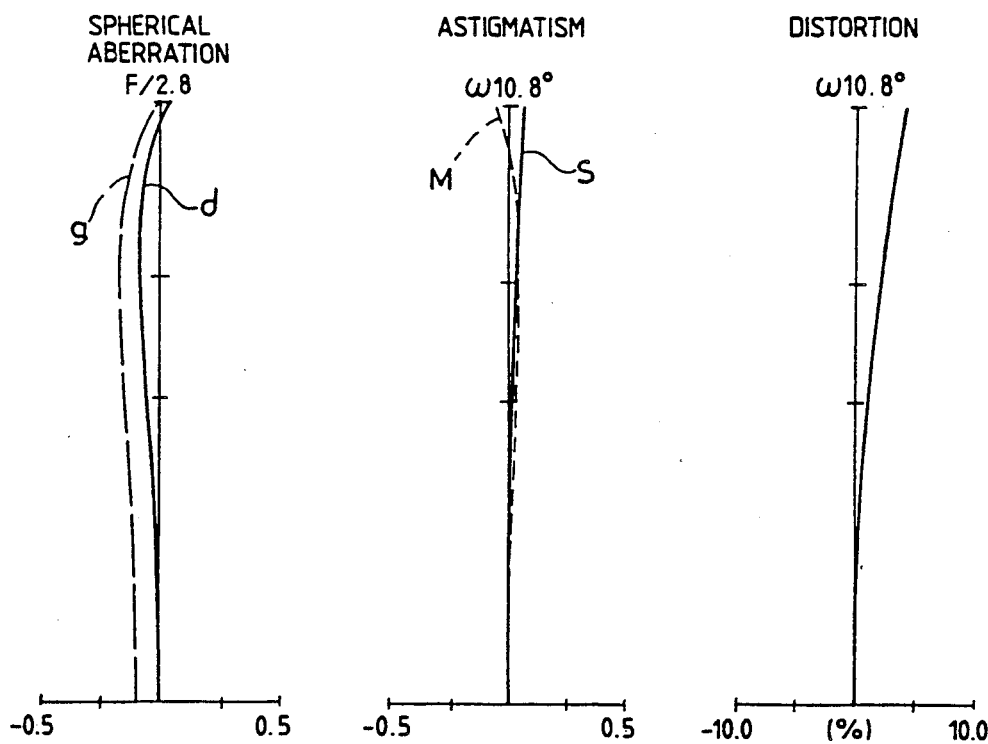
Figure 31:
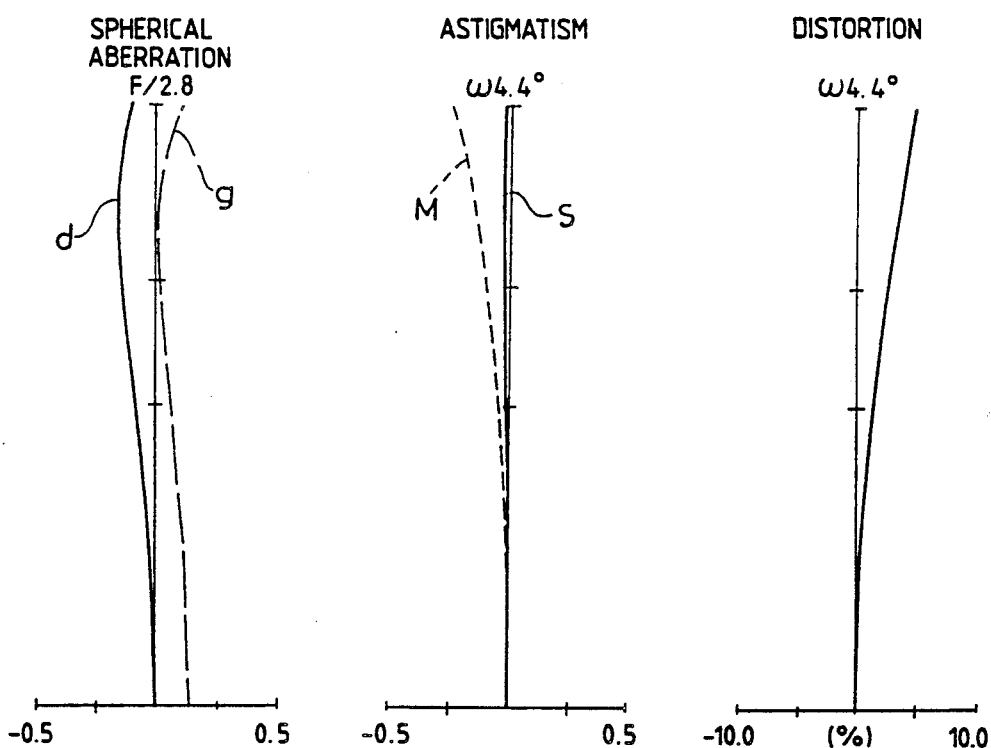

The Embodiment 7 of the present invention has the composition illustrated in FIG. 7 wherein the first lens unit and the second lens unit have the same compositions as those used in the Embodiment 5. The third lens unit comprises a biconvex lens component, and the fourth lens unit comprises a biconvex lens component, a biconvex lens component having an aspherical surface on the image side and a biconvex lens component having an aspherical surface on the image side which are arranged in the order from the object side. The aspherical surface used on the biconcave lens component in the fourth lens unit is adopted for correcting coma more favorably. Unlike the other Embodiments, the Embodiment 7 is so designed as to have a higher vari-focal ratio by shifting the first lens unit along a locus running first toward the image side and then returned toward the object side for varying focal length from the wide position to the tele position. Aberration characteristics of the Embodiment 7 at the wide position, the intermediate focal length and the tele position thereof are illustrated in FIG. 29, FIG. 30 and FIG. 31 respectively.

Figure 8:
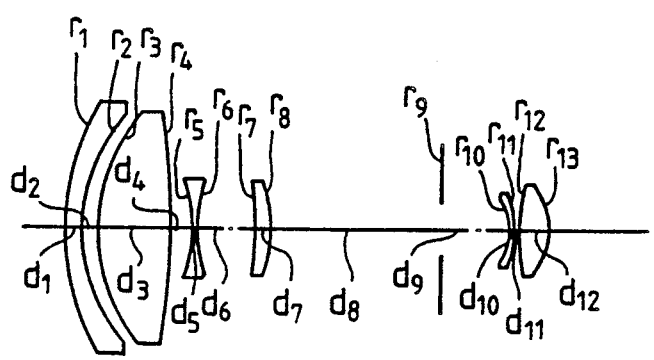
Figure 32:
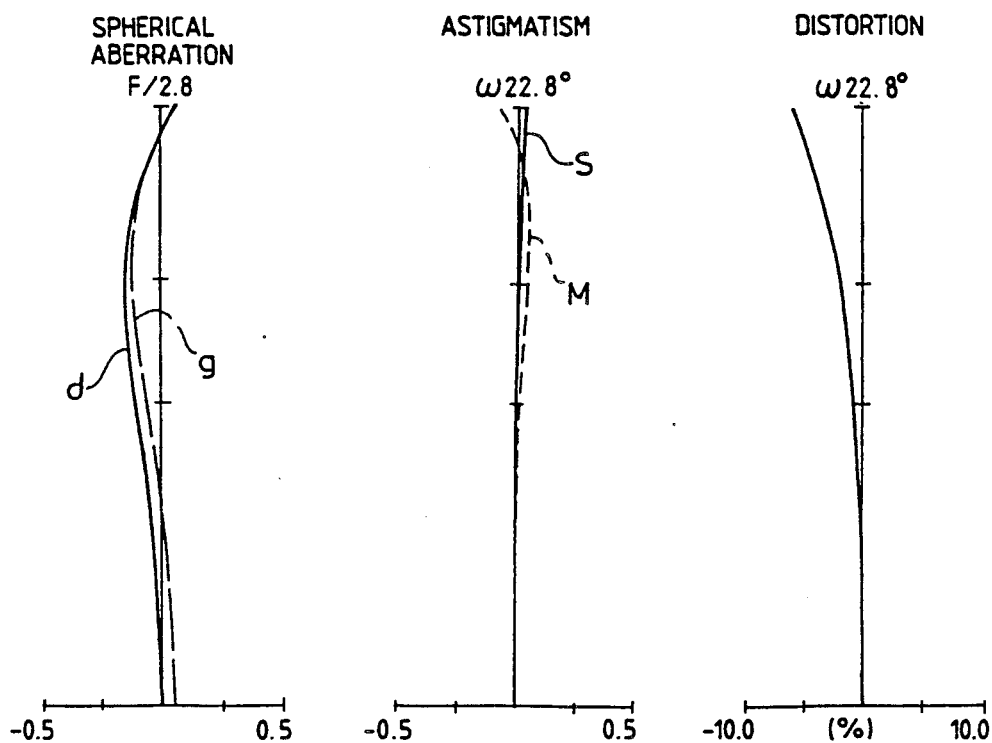
FIG. 32 through FIG. 34 show curves illustrating aberration characteristics of the Embodiment 8 of the present invention.
Figure 33:
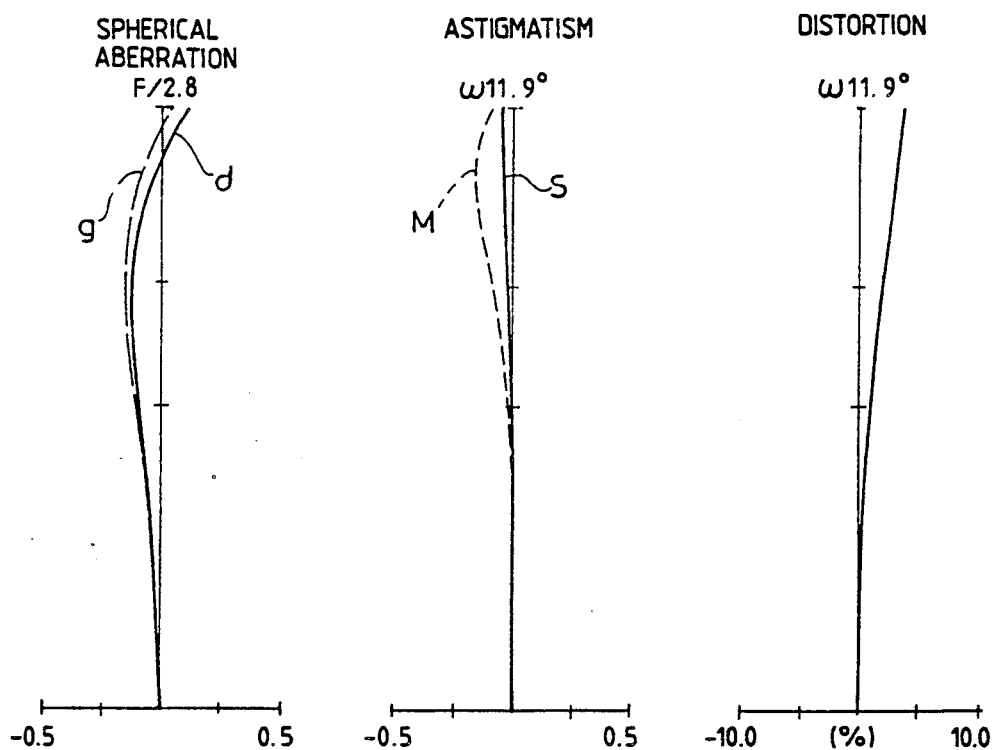
Figure 34:
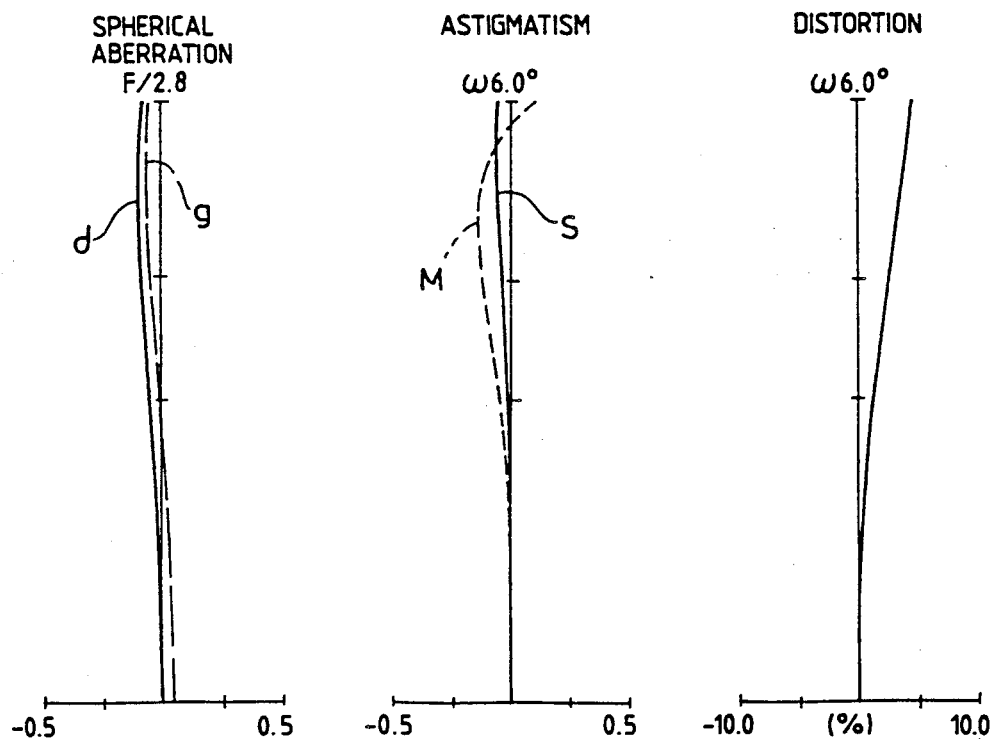

The Embodiment 8 of the present invention has the composition shown in FIG. 8 where in the first lens unit comprises a negative lens component having a concave surface on the image side and a biconvex lens component arranged in the order from the object side, the second lens unit comprises a biconcave lens component having an aspherical surface on the image side, the third lens unit comprises a positive meniscus lens component having a convex surface on the image side, and the fourth lens unit comprises a negative meniscus lens component having an aspherical surface on the image side and a concave surface on the object side, and a biconvex lens component having an aspherical surface on the image side which are arranged in the order from the object side. The aspherical surface selected on the negative meniscus lens component in the fourth lens unit is adopted for correcting coma of high orders. Aberration characteristics of the Embodiment 8 at the wide position, the intermediate focal length and the tele position thereof are illustrated in FIG. 32, FIG. 33 and FIG. 34 respectively.

Figure 9:
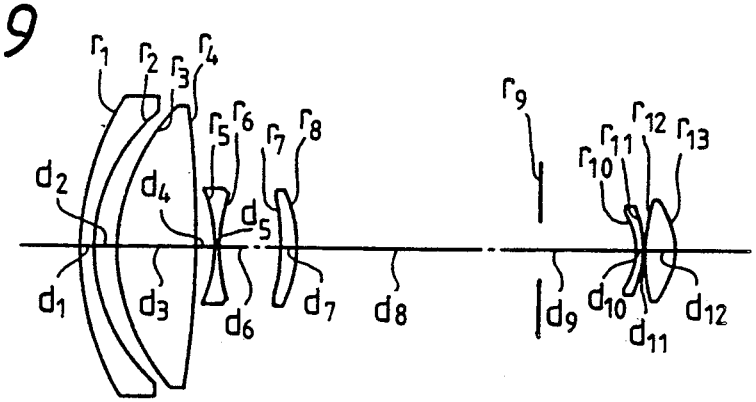
Figure 35:
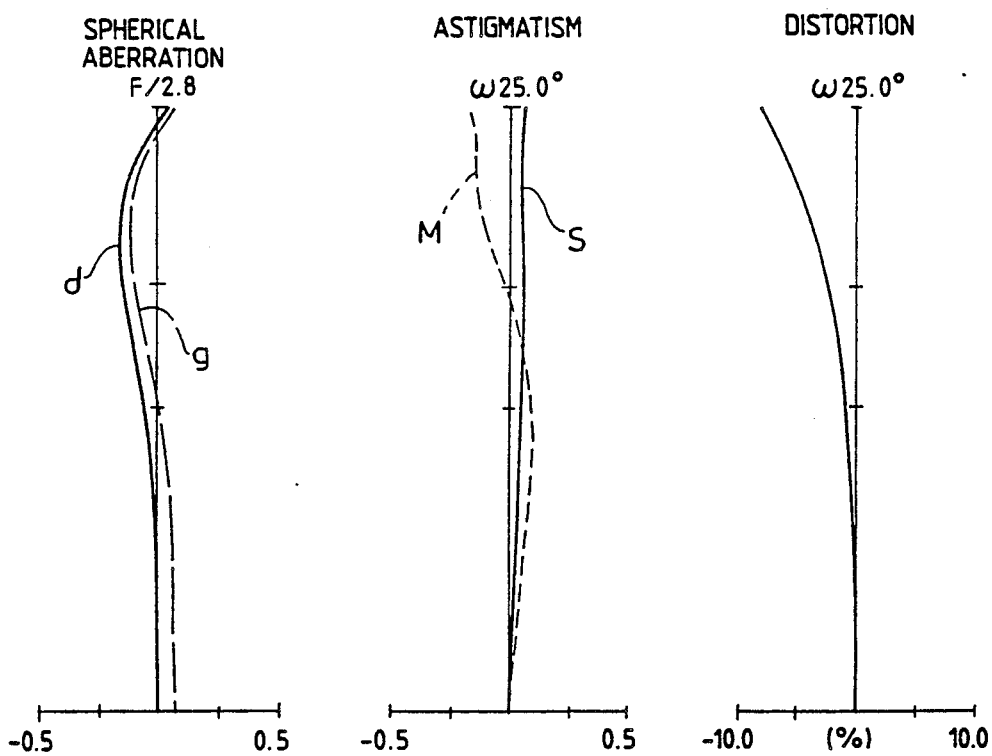
FIG. 35 through FIG. 37 show curves illustrating aberration characteristics of the Embodiment 9 of the present invention.
Figure 36:
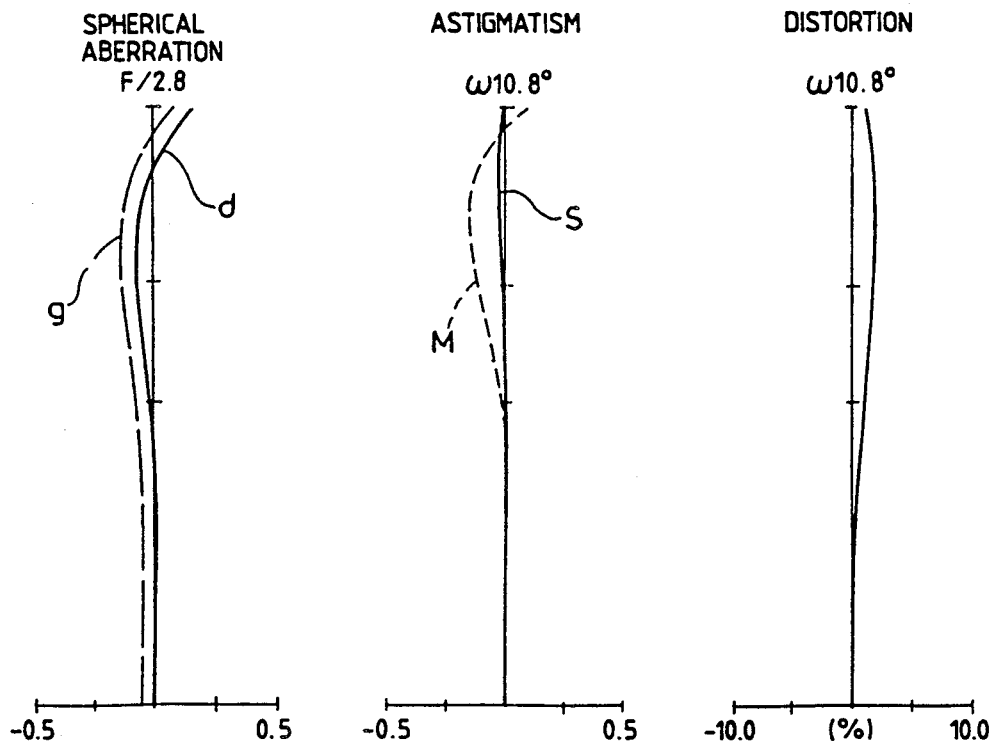
Figure 37:
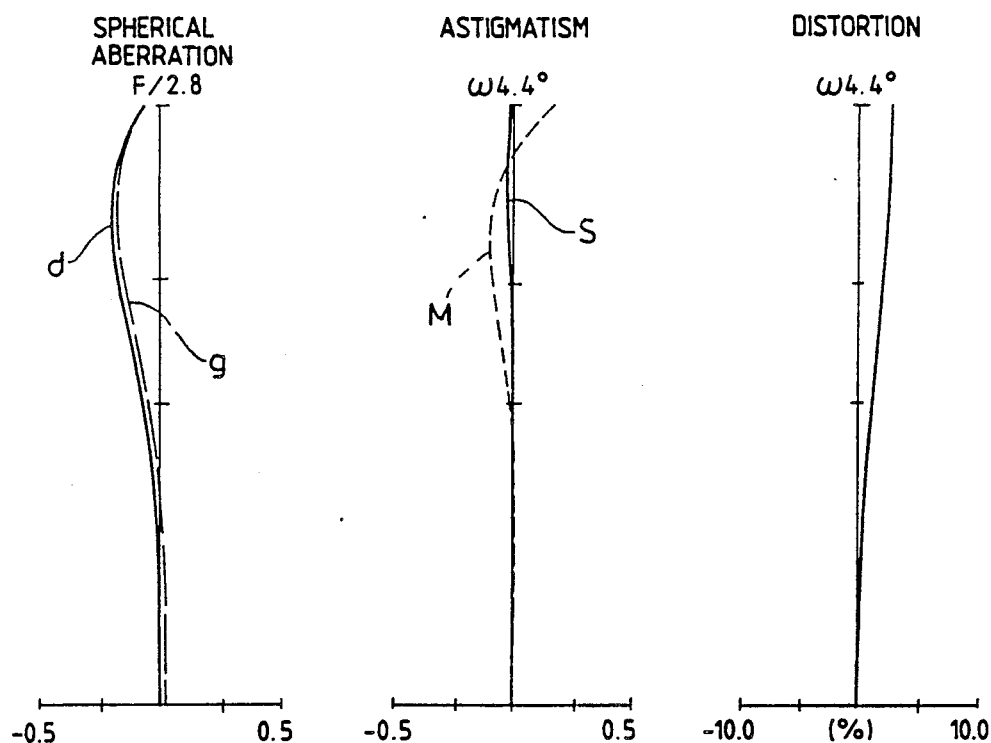

The Embodiment 9 of the present invention has the composition shown in FIG. 9 which is selected for obtaining a vari-focal ratio higher than that of the Embodiment 8 by modifying this embodiment. In other words, the Embodiment 9 has the same composition as that of the Embodiment 8, except for the aspherical surface adopted as the object side surface of the third lens unit which is adopted for preventing astigmatism from being varied by changing focal length in the Embodiment 9. Aberration characteristics of the Embodiment 9 at the wide position, the intermediate focal length and the tele position thereof, are visualized in FIG. 35, FIG. 36 and FIG. 37 respectively.

Figure 10:
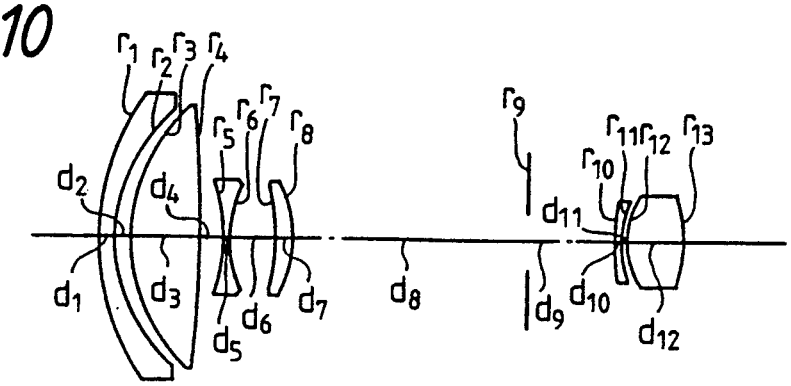
Figure 38:
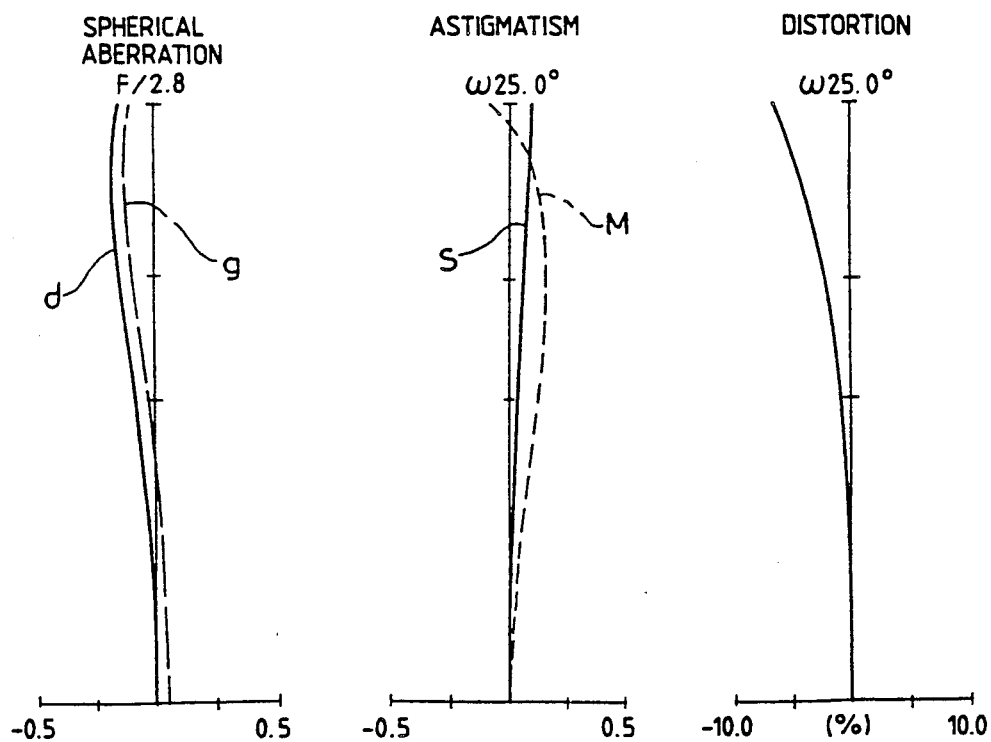
FIG. 38 through FIG. 40 show curves illustrating aberration characteristics of the Embodiment 10 of the present invention.
Figure 39:
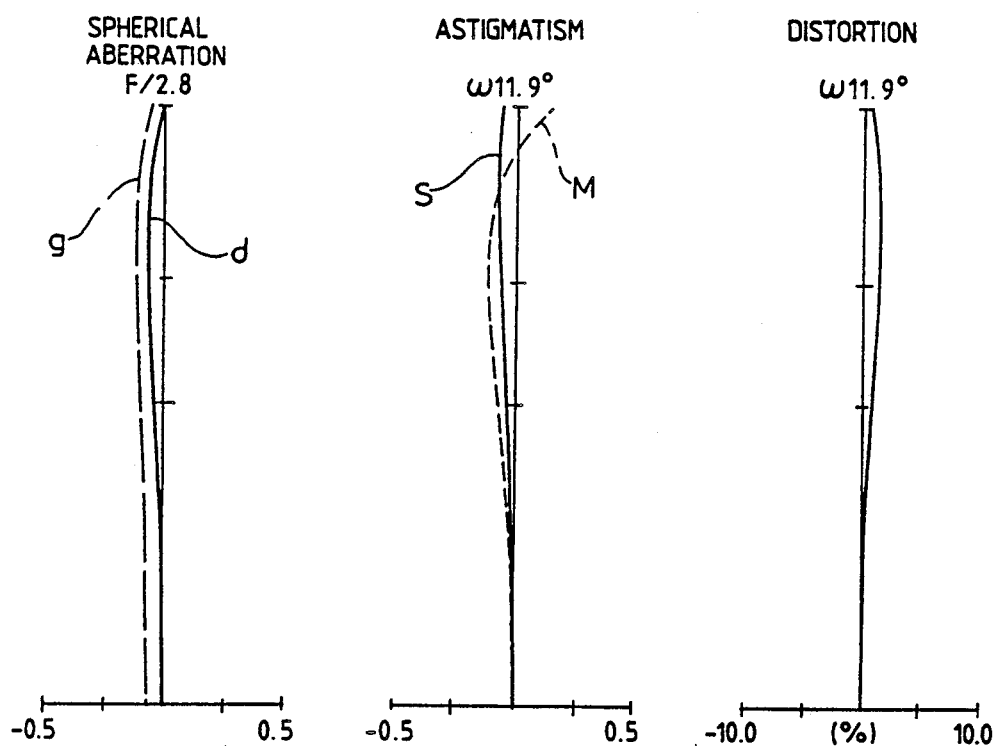
Figure 40:
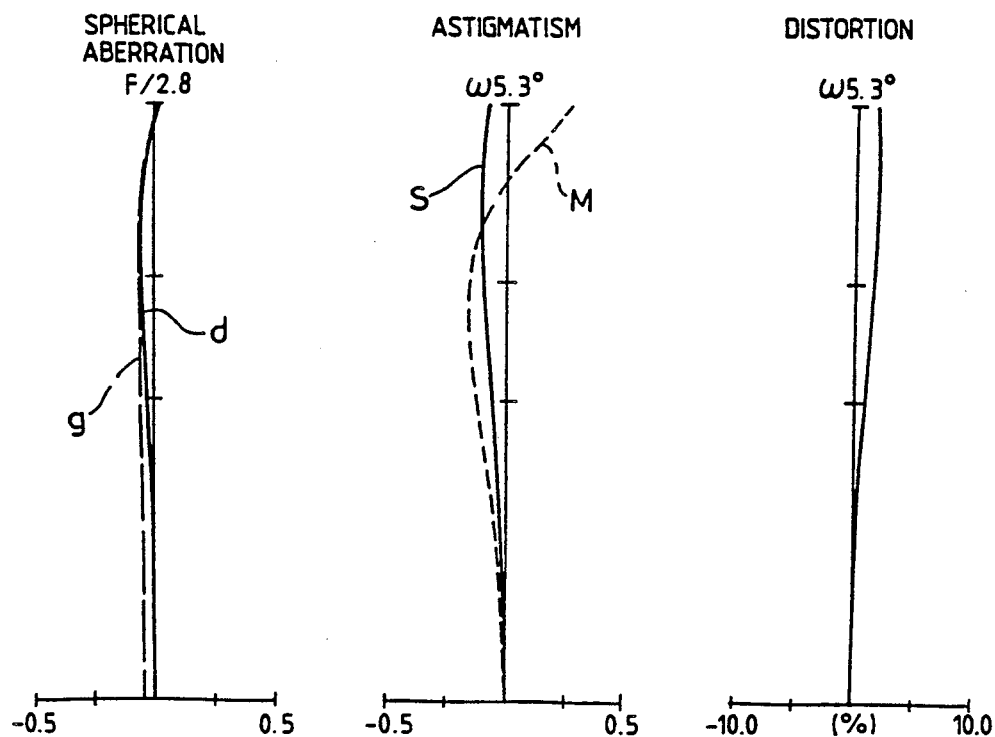

The Embodiment 10 of the present invention has the composition illustrated in FIG. 10 wherein the first lens unit, the second lens unit and the third lens unit have the same compositions as those used in the Embodiment 9. The fourth lens unit of the Embodiment 10 comprises a negative meniscus lens component having a concave surface on the image side and a biconvex lens component having an aspherical surface on the image side which are arranged in the order from the object side. Aberration characteristics of the Embodiment 10 at the wide position, the intermediate focal length and the tele position thereof are illustrated in FIG. 38, FIG. 39 and FIG. 40 respectively.

The vari-focal lens system according to the present invention is composed of a very small number of lens components, concretely six to eight lens components in total, by omitting a lens component in the second lens unit of the conventional zoom lens system. Moreover, the vari-focal lens system according to the present invention has a vari-focal ratio of 4 to 6, an F-number on the order of F/1.6 to F/2.8, compact design, light weight and is manufacturable at low cost.

I claim:
1. A vari-focal lens system comprising:
a first lens unit having positive refractive power;
a second lens unit movable for varying focal length and having negative refractive power;
a third lens unit movable for varying focal length and having positive refractive power; and a fourth lens unit kept fixed during variation of focal length;

said second lens unit and said third lens unit being shifted along an optical axis while varying airspace reserved therebetween for varying focal length and correcting deviation of image position caused by variation of focal length, said second lens unit consisting of a single biconcave lens component having an aspherical surface, said third lens unit consisting of a single lens component having positive refractive power, and said aspherical surface of said second lens unit satisfying the following condition (1): ps $$3\times 10^{-3} < |\Delta X \cdot r/h \cdot f_w| < 5\times 10^{-1} \qquad (1)\, ps$$

wherein the reference symbol r represents a radius of curvature on the standard spherical surface of the aspherical surface used in the second lens unit, the reference symbol h designates distance from the optical axis to the intersection between the ray to attain to the maximum image height and said aspherical surface, the reference symbol $\Delta x$ denotes deviation of said intersection from the standard spherical surface in the direction along the optical axis, and the reference symbol $f_w$ represents focal length of the vari-focal lens system as a whole at a wide position thereof.

2. A vari-focal lens system according to claim 1 wherein said fourth lens unit comprises an aspherical surface as the image side surface of the lens component arranged on the extreme image side and is so designed as to satisfy the following conditions (2), (3) and (4):

$$\nu_2 - \nu_3 > 15 \qquad (2)$$

$$|D_w - D_t|/\Delta D < 0.6 \qquad (3)\, ps$$
$$1\times 10^{-3} < |\Delta X_4 \cdot f_{IVB}/k \cdot f_w| < 2\times 10^{-1} \qquad (4)$$

wherein the reference symbols $\nu_2$ and $\nu_3$ represent Abbe's numbers of the biconcave lens component arranged in the second lens unit and the positive lens component arranged in the third lens unit respectively, the reference symbols $D_w$ and $D_t$ designate airspaces between the second lens unit ant he third lens unit at a wide position and a tele position respectively, and the reference symbol $\Delta D$ denotes shift distance of the second lens unit for varying focal length from the wide position to the tele position, the reference symbol k represents distance from the optical axis to the intersection between a paraxial marginal ray and said aspherical surface in the fourth lens unit, the reference symbol $\Delta X_4$ designates deviation of said intersection from the standard spherical surface in a direction along the optical axis and the reference symbol $f_{IVB}$ denotes focal length of the lens component arranged on an extreme image side in the fourth lens unit.

3. A vari-focal lens system according to claim 1 satisfying the following conditions (2), (3), (5) and (6):

$$\nu_2 - \nu_3 > 15 \qquad (2)$$

$$|D_w - D_T|/\Delta D < 0.6 \qquad (3)$$

$$-1.5 < HB_I/f_s < -4\times 10^{-2} \qquad (5)$$

$$-7\times 10^{-2} < HB_{II}/f_s < -1.5\times 10^{-3} \qquad (6)$$

wherein the reference symbols $\nu_2$ and $\nu_3$ represent Abbe's numbers of the biconcave lens component arranged in the second lens unit and the positive lens component arranged in the third lens unit respectively, the reference symbols $D_W$ and $D_T$ designate airspaces between the second lens unit and the third lens unit at the wide position and the tele position respectively, and the reference symbol $\Delta D$ denotes shift distance of the second lens unit for varying focal length from the wide position the tele position, the reference symbol $HB_I$ represents distance as measured from the extreme image side surface of the first lens unit to the rear principal point of the first lens unit, the reference symbol $HB_{II}$ designates distance as measured from the image side surface of the negative lens component arranged in the second lens unit to the rear principal point of the second lens unit and the reference symbol $f_s$ denotes the intermediate focal length of the vari-focal system as a whole.

4. A vari-focal lens system according to claim 1 satisfying the following conditions (2), (3) and (7):

$$\nu_2 - \nu_3 > 15 \qquad (2)$$

$$|D_W - D_T|/\Delta D < 0.6 \qquad (3)$$

$$0.3 < |f_{I\, II\, III}/f_{IV}| < 7 \qquad (7)$$

wherein the reference symbols $\nu_2$ and $\nu_3$ represent Abbe's numbers of the biconcave lens component arranged in the second lens unit and the positive lens component arranged in the third lens unit respectively, the reference symbols $D_W$ and $D_T$ designate airspaces between the second lens unit and the third lens unit at a wide position and a tele position respectively, and the reference symbol $\Delta D$ denotes shift distance of the second lens unit for varying focal length from the wide position to the tele position, wherein the reference symbol $f_{I\, II\, III}$ represents composite focal length of the first lens unit, the second lens unit and the third lens unit taken as a whole, and the reference symbol $f_{IV}$ designates focal length of the fourth lens unit.

5. A vari-focal lens system according to claim 1 comprising an aspherical surface in the third lens unit and satisfying the following conditions (2) and (3):

$$\nu_2 - \nu_3 > 15 \qquad (2)$$

$$|D_W - D_T|/\Delta D < 0.6 \qquad (3)$$

wherein the reference symbols $\nu_2$ and $\nu_3$ represent Abbe's numbers of the biconcave lens component arranged in the second lens unit and the positive lens component arranged in the third lens unit respectively, the reference symbols $D_W$ and $D_T$ designate airspaces between the second lens unit and the third lens unit at a wide position and a tele position respectively, and the reference symbol $\Delta D$ denotes shift distance of the second lens unit for varying focal length from the wide position to the tele position.

6. A vari-focal lens system according to claim 1 wherein the first lens unit is movable along the optical axis for varying length, and said lens system satisfies the following conditions (2) and (3):

$$\nu_2 - \nu_3 > 15 \qquad (2)$$

$$|D_W - D_T|/\Delta D < 0.6 \qquad (3)$$

Wherein the reference symbols $\nu_2$ and $\nu_3$ represent Abbe's numbers of the biconcave lens component arranged in the second lens unit and the positive lens component arranged in the third lens unit respectively, the reference symbols $D_W$ and $D_T$ designate airspaces between the second lens unit and the third lens unit at a wide position and a tele position respectively, and the reference symbol ΔD denotes shift distance of the second lens unit for varying focal length from the wide position to the tele position.

7. A vari-focal lens system according to claim 2 satisfying the following conditions (5) and (6):

$$-1.5 - HB_I/f_S < -4 \times 10^{-2} \quad (5)$$

$$-7 \times 10^{-2} < HB_{II}/f_S < -1.5 \times 10^{-3} \quad (6)$$

wherein the reference symbol $HB_I$ represents distance as measured from the extreme image side surface of the first lens unit to the rear principal point of the first lens unit, the reference symbol $HB_{II}$ designates distance as measured from the image side surface of the negative lens component arranged in the second lens unit to the rear principal point of the second lens unit and the reference symbol $f_S$ denotes the intermediate focal length of the vari-focal system as a whole.

8. A vari-focal lens system according to claim 2 satisfying the following condition (7):

$$0.3 < |f_{I\,II\,III}/f_{IV}| < 7 \quad (7)$$

wherein the reference symbol $f_{I\,II\,III}$ represents composite focal length of the first lens unit, the second lens unit and the third lens unit taken as a whole, and the reference symbol $f_{IV}$ designates focal length of the fourth lens unit.

9. A vari-focal lens system according to claim 2 comprising an aspherical surface in the third lens unit.

10. A vari-focal lens system according to claim 2 wherein the first lens unit is movable along the optical axis for varying focal length.

11. A vari-focal lens system according to claim 7 satisfying the following condition (7):

$$0.3 < |f_{I\,II\,III}/f_{IV}| < 7 \quad (7)$$

wherein the reference symbol $f_{I\,II\,III}$ represents composite focal length of the first lens unit, the second lens unit and the third lens unit taken as a whole, and the reference symbol $f_{IV}$ designates focal length of the fourth lens unit.

12. A vari-focal lens system according to claim 7 comprising an aspherical surface in the third lens unit.

13. A vari-focal lens system according to claim 7 wherein the first lens unit is movable along the optical axis for varying focal length.

14. A vari-focal lens system according to claim 11 comprising an aspherical surface in the third lens unit.

15. A vari-focal lens system according to claim 11 wherein the first lens unit is movable along the optical axis for varying focal length.

16. A vari-focal lens system according to claim 2 or 3 wherein the first lens unit comprises a positive cemented doublet and a positive meniscus lens component having a convex surface on the object side.

17. A vari-focal lens system according to claim 2, 3 or 5 wherein the first lens unit comprises a cemented doublet consisting of a negative meniscus lens element having a convex surface on an object side and a positive lens element having a convex surface on an object side.

18. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length, said second lens unit consisting of a single biconcave lens component having an aspherical surface, and said third lens unit consisting of a single lens component having positive refractive power, said lens system satisfying the following conditions (2) and (3):

$$\nu_2 - \nu_3 > 15 \quad (2)$$

$$|D_W - D_T|/\Delta D < 0.6 \quad (3)$$

wherein the reference symbols $\nu_2$ and $\nu_3$ represent Abbe's numbers of the biconcave lens component arranged in the second lens unit and the positive lens component arranged in the third lens unit respectively, the reference symbols $D_W$ and $D_T$ designate airspaces between the second lens unit and the third lens unit at a wide position and a tele position respectively, and the reference symbol ΔD denotes shift distance of the second lens unit for varying focal length from the wide position to the tele position.

19. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length, said second lens unit consisting of a single biconcave lens component having an aspherical surface, said third lens unit consisting of a single lens component having positive refractive power, and
said fourth lens unit comprising an aspherical surface as the image side surface of the lens component arranged on the extreme image side and being so designated as to satisfy the following condition (4):

$$1 \times 10^{-3} < |\Delta X_4 \cdot F_{IVB}/k \cdot f_W| < 2 \times 10^{-1} \quad (4)$$

wherein the reference symbol k represents distance from the optical axis to the intersection between the paraxial marginal ray and said aspherical surface in the fourth lens unit, the reference symbol $\Delta X_4$ designates deviation of said intersection from the standard spherical surface in the direction along the optical axis and the reference symbol $f_{IVB}$ denotes focal length of the lens component arranged on an extreme image side in the fourth lens unit.

20. A vari-focal lens system comprising:
a first lens unit having positive refractive power;

a second lens unit movable for varying focal length and having negative refractive power;

a third lens unit movable for varying focal length and having positive refractive power; and a fourth lens unit kept fixed during variation of focal length;

said second lens unit and said third lens unit being shifted along an optical axis while varying airspace reserved therebetween for varying focal length and correcting deviation of image position caused by variation of focal length, said second lens unit consisting of a single biconcave lens component having an aspherical surface, said third lens unit consisting of a single lens component having positive refractive power, and said lens system satisfying the following conditions (5) and (6):

$$-1.5 < HB_I/f_s < -4 \times 10^{-2} \tag{5}$$

$$-7 \times 10^{-2} < HB_{II}/f_s < -1.5 \times 10^{-3} \tag{6}$$

wherein the reference symbol $HB_I$ represents distance as measured from the extreme image side surface of the first lens unit to a rear principal point of the first lens unit, the reference symbol $HB_{II}$ designates distance as measured from the image side surface of the negative lens component arranged in the second lens unit to a rear principal point of the second lens unit and the reference symbol $f_s$ denotes the intermediate focal length of the vari-focal system as a whole.

21. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length, said second lens unit consisting of a single biconcave lens component having an aspherical surface, said third lens unit consisting of a single lens component having positive refractive power, and said lens system satisfying the following condition (7):

$$0.3 < |f_{I\,II\,III}/f_{IV}| < 7 \tag{7}$$

wherein the reference symbol $f_{I\,II\,III}$ represents composite focal length of the first lens unit, the second lens unit and the third lens unit taken as a whole, and the reference symbol $f_{IV}$ designates focal length of the fourth lens unit.

22. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length, said second lens unit consisting of a single biconcave lens component having an aspherical surface, said third lens unit consisting of a single lens component having positive refractive power; and said first lens unit being movable along the optical axis for varying focal length.

23. A vari-focal lens system according to one of claims 18, 19, 20, 21 or 22 wherein the aspherical surface of said second lens unit satisfies the following condition (1):

$$3 \times 10^{-3} < |\Delta X \cdot r / h \cdot f_W| < 5 \times 10^{-1} \tag{1}$$

wherein the reference symbol r represents radius of curvature on the standard spherical surface of the aspherical surface used in the second lens unit, the reference symbol h designates distance from the optical axis to the intersection between the ray to attain to the maximum image height and said aspherical surface, the reference symbol $\Delta X$ denotes deviation of said intersection from the standard spherical surface in the direction along the optical axis, and the reference symbol $f_W$ represents focal length of the vari-focal lens system as a whole at a wide position thereof.

24. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length, said second lens unit consisting of a single biconcave lens component having an aspherical surface, said third lens unit consisting of a single lens component having positive refractive power, and said first lens unit consisting of negative meniscus lens element and a positive lens component, both convex on the object side, said negative meniscus lens element and said positive lens component having only an airspace interposed therebetween.

25. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length;
said second lens unit consisting of a single biconcave lens component having an aspherical surface, said third lens unit consisting of a single lens component having positive refractive power, and said fourth lens unit consisting of a positive lens component, a negative lens component, and a positive lens component.

26. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length;
said second lens unit consisting of a single biconcave lens component having an aspherical surface, said third lens unit consisting of a single lens component having positive refractive power, and said fourth lens unit consisting of a negative lens component and a positive lens component.

27. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length;
said second lens unit consisting of a single biconcave lens component having an aspherical surface, said third lens unit consisting of a single lens component having positive refractive power, and said fourth lens unit consisting of a positive lens component, a negative lens component, a positive lens component and a positive lens component.

28. A vari-focal lens system comprising:
a first lens unit having positive refractive power;
a second lens unit movable for varying focal length and having negative refractive power;
a third lens unit movable for varying focal length and having positive refractive power; and
a fourth lens unit kept fixed during variation of focal length;
said second lens unit and said third lens unit being shifted along an optical axis while varying airspace reserved therebetween for varying focal length and correcting deviation of image position caused by variation of focal length, said second lens unit consisting of a single biconcave lens component having an aspherical surface, and said lens system comprising an aspherical surface in the third lens unit; and
wherein the aspherical surface of said second lens unit satisfies the following condition (1):

$$23 \times 10^{-3} < |\Delta X \cdot r / h \cdot f_W| < 5 \times 10^{-1} \tag{1}$$

wherein the reference symbol r represents radius of curvature on the standard spherical surface of the aspherical surface used in the second lens unit, the reference symbol h designates distance from the optical axis to the intersection between the ray to attain to the maximum image height and said aspherical surface, the reference symbol $\Delta X$ denotes deviation of said intersection from the standard spherical surface in the direction along the optical axis, and the reference symbol $f_W$ represents focal length of the vari-focal lens system as a whole at a wide position thereof.

* * * * *